(12) United States Patent
Wagner et al.

(10) Patent No.: US 10,843,333 B2
(45) Date of Patent: Nov. 24, 2020

(54) SYSTEMS AND METHODS FOR PROCESSING OBJECTS, INCLUDING AUTOMATED RE-CIRCULATING PROCESSING STATIONS

(71) Applicant: Berkshire Grey, Inc., Lexington, MA (US)

(72) Inventors: Thomas Wagner, Concord, MA (US); Kevin Ahearn, Fort Mill, SC (US); Benjamin Cohen, Somerville, MA (US); Michael Dawson-Haggerty, Pittsburgh, PA (US); Christopher Geyer, Arlington, MA (US); Victoria Hinchey, Winchester, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, San Jose, CA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

(21) Appl. No.: 16/001,630

(22) Filed: Jun. 6, 2018

(65) Prior Publication Data

US 2019/0270197 A1  Sep. 5, 2019

Related U.S. Application Data

(60) Provisional application No. 62/638,724, filed on Mar. 5, 2018.

(51) Int. Cl.
  *B25J 9/00* (2006.01)
  *B65G 1/137* (2006.01)
  (Continued)

(52) U.S. Cl.
  CPC .......... *B25J 9/0093* (2013.01); *B25J 9/1669* (2013.01); *B65D 5/001* (2013.01); *B65D 5/4212* (2013.01);
  (Continued)

(58) Field of Classification Search
  CPC combination set(s) only.
  See application file for complete search history.

(56) References Cited

U.S. PATENT DOCUMENTS

| 3,592,326 A | 7/1971 | Zimmerle et al. |
| 4,678,390 A | 7/1987 | Bonneton et al. |

(Continued)

FOREIGN PATENT DOCUMENTS

| AU | 2006204622 A1 | 3/2007 |
| CN | 102390701 A | 3/2012 |

(Continued)

OTHER PUBLICATIONS

International Search Report & Written Opinion issued by the International Searching Authority in related international Application No. PCT/US2019/020530 dated Aug. 12, 2019, 18 pages.

(Continued)

*Primary Examiner* — Thomas Randazzo
(74) *Attorney, Agent, or Firm* — Gesmer Updegrove LLP

(57) ABSTRACT

A method of processing objects using a programmable motion device is disclosed. The method includes the steps of providing an input conveyance system by which input bins of objects may be provided to a processing station that includes the programmable motion device that includes an end effector, perceiving at the processing station identifying (Continued)

indicia representative of an identity of a plurality of objects at an input area of the input conveyance system, grasping the an acquired object using the end effector, moving the acquired object toward an identified processing container using the programmable motion device, the identified processing container being associated with the identifying indicia and said identified processing container being provided as one of a plurality of processing containers at the processing station, and providing an output conveyance system in communication with the processing station, by which processing containers that contain processed objects may be provided.

46 Claims, 28 Drawing Sheets

(51) Int. Cl.
    *G05B 19/418*     (2006.01)
    *G06Q 10/08*     (2012.01)
    *B65D 5/00*     (2006.01)
    *B25J 9/16*     (2006.01)
    *B65D 5/42*     (2006.01)

(52) U.S. Cl.
    CPC ....... *B65G 1/1378* (2013.01); *G05B 19/4182* (2013.01); *G06Q 10/08* (2013.01); *G06Q 10/087* (2013.01); *B65G 1/1376* (2013.01); *B65G 2201/025* (2013.01); *B65G 2201/0258* (2013.01); *B65G 2203/0216* (2013.01); *B65G 2203/041* (2013.01); *B65G 2203/044* (2013.01); *G05B 2219/31078* (2013.01); *G05B 2219/39102* (2013.01); *G05B 2219/39106* (2013.01); *G05B 2219/40554* (2013.01)

(56) References Cited

U.S. PATENT DOCUMENTS

| | | | |
|---|---|---|---|
| 4,722,653 A | 2/1988 | Williams et al. | |
| 4,759,439 A | 7/1988 | Hartlepp | |
| 4,846,335 A | 7/1989 | Hartlepp | |
| 4,895,242 A | 1/1990 | Michel | |
| 5,190,162 A | 3/1993 | Hartlepp | |
| 5,839,566 A | 11/1998 | Bonnet | |
| 6,505,093 B1* | 1/2003 | Thatcher | B65G 1/1376 |
| | | | 700/214 |
| 6,579,053 B1 | 6/2003 | Grams et al. | |
| 6,685,031 B2 | 2/2004 | Takizawa | |
| 6,762,382 B1 | 7/2004 | Danelski | |
| 6,897,395 B2 | 5/2005 | Shiibashi et al. | |
| 8,776,694 B2 | 7/2014 | Rosenwinkel et al. | |
| 9,102,336 B2 | 8/2015 | Rosenwinkel | |
| 9,272,845 B2 | 3/2016 | Honkanen et al. | |
| 9,481,518 B2 | 11/2016 | Neiser | |
| 9,687,982 B1 | 6/2017 | Jules et al. | |
| 9,751,693 B1 | 9/2017 | Battles et al. | |
| 9,926,138 B1 | 3/2018 | Brazeau et al. | |
| 10,007,827 B2 | 6/2018 | Wagner et al. | |
| 10,029,865 B1 | 7/2018 | McCalib, Jr. et al. | |
| 2001/0038784 A1 | 11/2001 | Peltomaki | |
| 2002/0087231 A1* | 7/2002 | Lewis | B65G 1/1373 |
| | | | 700/230 |
| 2002/0092801 A1* | 7/2002 | Dominguez | B07C 5/3412 |
| | | | 209/583 |
| 2002/0157919 A1 | 10/2002 | Sherwin | |
| 2002/0179502 A1 | 12/2002 | Cerutti et al. | |
| 2003/0038065 A1 | 2/2003 | Pippin et al. | |
| 2007/0132580 A1 | 6/2007 | Ambrefe | |
| 2007/0185613 A1* | 8/2007 | Feldenzer | G06Q 10/087 |
| | | | 700/225 |
| 2007/0209976 A1 | 9/2007 | Worth et al. | |
| 2008/0181753 A1 | 7/2008 | Bastian et al. | |
| 2010/0122942 A1 | 5/2010 | Harres et al. | |
| 2010/0318216 A1 | 12/2010 | Faivre et al. | |
| 2011/0144798 A1 | 6/2011 | Freudelsperger | |
| 2011/0238207 A1 | 9/2011 | Bastian, II et al. | |
| 2011/0243707 A1 | 10/2011 | Dumas et al. | |
| 2012/0118699 A1 | 5/2012 | Buuchmann et al. | |
| 2012/0177465 A1 | 7/2012 | Koholka | |
| 2013/0110280 A1 | 5/2013 | Folk | |
| 2014/0244026 A1* | 8/2014 | Neiser | B65G 1/1378 |
| | | | 700/216 |
| 2014/0291112 A1 | 10/2014 | Lyon et al. | |
| 2014/0364998 A1 | 12/2014 | Neiser et al. | |
| 2015/0098775 A1 | 4/2015 | Razumov | |
| 2015/0114799 A1 | 4/2015 | Hansl et al. | |
| 2015/0375880 A1 | 12/2015 | Ford et al. | |
| 2016/0007737 A1 | 1/2016 | Clark et al. | |
| 2016/0221187 A1 | 8/2016 | Bradski et al. | |
| 2016/0221762 A1 | 8/2016 | Schroader | |
| 2016/0244262 A1* | 8/2016 | O'Brien | B25J 9/1697 |
| 2016/0355337 A1 | 12/2016 | Lert et al. | |
| 2017/0043953 A1 | 2/2017 | Battles et al. | |
| 2017/0076251 A1* | 3/2017 | Simske | G06Q 10/0833 |
| 2017/0080566 A1 | 3/2017 | Stubbs et al. | |
| 2017/0080571 A1 | 3/2017 | Wagner et al. | |
| 2017/0106532 A1 | 4/2017 | Wellman et al. | |
| 2017/0121113 A1 | 5/2017 | Wagner et al. | |
| 2017/0136632 A1 | 5/2017 | Wagner et al. | |
| 2017/0157648 A1 | 6/2017 | Wagner et al. | |
| 2017/0225330 A1 | 8/2017 | Wagner et al. | |
| 2017/0322561 A1 | 11/2017 | Stiernagle | |
| 2017/0349385 A1 | 12/2017 | Moroni et al. | |
| 2017/0369244 A1 | 12/2017 | Battles et al. | |
| 2018/0085788 A1 | 3/2018 | Engel et al. | |
| 2018/0130015 A1* | 5/2018 | Jones | B65B 57/12 |
| 2018/0244473 A1 | 8/2018 | Mathi et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2019/0022702 A1 | 1/2019 | Vegh et al. | |

FOREIGN PATENT DOCUMENTS

| | | |
|---|---|---|
| CN | 106395225 A | 2/2017 |
| DE | 102005061309 A1 | 7/2007 |
| DE | 102006057658 A1 | 6/2008 |
| DE | 102007023909 A1 | 11/2008 |
| DE | 102007038834 A1 | 2/2009 |
| DE | 102010002317 A1 | 8/2011 |
| EP | 0235488 A1 | 9/1987 |
| EP | 1995192 A2 | 11/2008 |
| EP | 3112295 A1 | 1/2017 |
| FR | 2832654 A1 | 5/2003 |
| JP | S4131278 A | 10/1979 |
| JP | S63310406 A | 12/1988 |
| JP | H0395001 A | 4/1991 |
| JP | 2000238906 A | 9/2000 |
| JP | 2007182286 A | 7/2007 |
| JP | 2008037567 A | 2/2008 |
| JP | 2014141313 A | 8/2014 |
| WO | 03074201 A1 | 9/2003 |
| WO | 2007009136 A1 | 1/2007 |
| WO | 2008091733 A2 | 7/2008 |
| WO | 2010017872 A1 | 2/2010 |
| WO | 2011038442 A2 | 4/2011 |
| WO | 2013178431 A1 | 12/2013 |
| WO | 2014166650 A1 | 10/2014 |
| WO | 2015035300 A1 | 3/2015 |
| WO | 2015118171 A1 | 8/2015 |
| WO | 2017036780 A1 | 3/2017 |
| WO | 2018175466 A1 | 9/2018 |
| WO | 2018176033 A1 | 9/2018 |

(56) References Cited

FOREIGN PATENT DOCUMENTS

OTHER PUBLICATIONS

Rembold et al., Object Turning for Barcode Search, Proceedings of the 2000 IEEE/RSJ International Conference on Intelligent Robots and Systems, pp. 1267-1272.
Cipolla et al., Visually guided grasping in unstructured environments, Robotics and Autonomous Systems 19.3-4 (1997): 337-346.
sping in Unstructured Environments, Journal of Robotics and Autonomous Systems (Invited Paper), 20 page.
Klingbeil et al., Grasping with Application to an Autonomous Checkout Robot, ResearchGate, Conference Paper in Proceedings—IEEE International Conference on Robotics and Automation—Jun. 2011, IEEE Xplore, 9 pages.
International Search Report & Written Opinion issued by International Searching Authority in related International Patent Application PCT/US2018/058193 dated Feb. 13, 2019, 17 pgs.
International Preliminary Report on Patentability issued by the International Bureau of WIPO in related International Application No. PCT/US2019/020530 dated Sep. 8, 2020, 12 pages.
International Preliminary Report on Patentability issued by the International Bureau of WIPO in related International Application No. PCT/US2018/058193 dated Sep. 8, 2020, 12 pages.

\* cited by examiner

SYSTEMS AND METHODS FOR PROCESSING OBJECTS, INCLUDING AUTOMATED RE-CIRCULATING PROCESSING STATIONS

PRIORITY

The present application claims priority to U.S. Provisional Patent Application Ser. No. 62/638,724 filed Mar. 5, 2018, the disclosure of which is hereby incorporated by reference in its entirety.

BACKGROUND

The invention generally relates to automated programmable motion control systems, e.g., robotic, sortation and other processing systems, and relates in particular to programmable motion control systems intended for use in environments requiring that a variety of objects (e.g., articles, packages, parcels etc.) be processed and moved to a number of processing destinations.

Many parcel distribution systems, for example, receive parcels in a disorganized stream or bulk transfer that may be provided as individual parcels or parcels aggregated in groups such as in bags, arriving on any of several different conveyances, commonly a conveyor, a truck, a pallet a Gaylord, or a bin etc. Each parcel must then be distributed to the correct destination location (e.g., a container) as determined by identification information associated with the parcel, which is commonly determined by a label printed on the parcel. The destination location may take many forms, such as a bag, a shelf, a container, or a bin.

FIG. 1 for example, shows an object distribution system 10 in which objects arrive, e.g., in trucks, as shown at 12, are separated and stored in packages that each include a specific combination of objects as shown at 14, and the packages are then shipped as shown at 16 to different retail stores, providing that each retail store receives a specific combination of objects in each package. Each package received at a retail store from transport 16, is broken apart at the store and such packages are generally referred to as break-packs. In particular, incoming trucks 12 contain vendor cases 18 of homogenous sets of objects. Each vendor case, for example, may be provided by a manufacturer of each of the objects. The objects from the vendor cases 18 are moved into decanted bins 20, and are then brought to a processing area 14 that includes break-pack store packages 22. At the processing area 14, the break-pack store packages 22 are filled by human workers that select items from the decanted vendor bins to fill the break-pack store packages according to a manifest. For example, a first set of the break-pack store packages may go to a first store (as shown at 24), and a second set of break-pack store packages may go to a second store (as shown at 26). In this way, the system may accept large volumes of product from a manufacturer, and then re-package the objects into break-packs to be provided to retail stores at which a wide variety of objects are to be provided in a specific controlled distribution fashion.

Such a system however, has inherent inefficiencies as well as inflexibilities since the desired goal is to match incoming objects to assigned collection bins. Such systems may require a large number of collection bins (and therefore a large amount of physical space, large investment costs, and large operating costs), in part, because sorting all objects to all destinations at once is not always most efficient. Additionally, such break-pack systems must also monitor the volume of each like object in a bin, requiring that a human worker continuously count the items in a bin.

Further, current state-of-the-art sortation systems also rely in human labor to some extent. Most solutions rely on a worker that is performing sortation, by scanning each object from an induction area (chute, table, etc.) and placing each object at a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Unfortunately, these systems do not address the limitations of the total number of system bins. The system is simply diverting an equal share of the total objects to each parallel manual cell. Thus, each parallel sortation cell must have all the same collection bin designations; otherwise, an object may be delivered to a cell that does not have a bin to which the object is mapped. There remains a need, therefore, for a more efficient and more cost effective object processing system that processes objects of a variety of sizes and weights into appropriate collection bins or trays of fixed sizes, yet is efficient in handling objects of varying sizes and weights.

SUMMARY

In accordance with an embodiment, the invention provides a method of processing objects using a programmable motion device. The method includes the steps of providing an input conveyance system by which input bins of objects may be provided to a processing station that includes the programmable motion device that includes an end effector, perceiving at the processing station identifying indicia representative of an identity of a plurality of objects at an input area of the input conveyance system, grasping the an acquired object using the end effector, moving the acquired object toward an identified processing container using the programmable motion device, the identified processing container being associated with the identifying indicia and said identified processing container being provided as one of a plurality of processing containers at the processing station, and providing an output conveyance system in communication with the processing station, by which processing containers that contain processed objects may be provided.

In accordance with another embodiment, the invention provides a method of processing objects using a plurality of programmable motion devices. The method includes the steps of providing an input conveyance system by which input bins of objects may be provided to a plurality of processing stations, each processing station including a programmable motion device that includes an end effector for grasping an object, perceiving, at each processing station, identifying indicia representative of an identity of a plurality of objects at an input area of the input conveyance system, moving, at each processing station, the acquired object toward an identified processing container using the programmable motion device, said identified processing container being associated with the identifying indicia and the identified processing container being provided as one of a plurality of processing containers, and providing an output conveyance system in communication with each processing station, by which processing containers that contain processed objects may be provided.

In accordance with yet another embodiment, the invention provides a method of processing objects using a plurality of programmable motion devices. The method includes the steps of providing an input conveyance system by which input bins of objects may be provided to a plurality of processing stations, each processing station including a programmable motion device that includes an end effector for grasping an object, and providing an output conveyance system in communication with each processing station, by which processing containers that contain processed objects may be provided, at least one of the input conveyance system and the output conveyance system being provided as a loop. At each processing station, the method further includes the steps of perceiving identifying indicia representative of an identity of a plurality of objects at an input area of the input conveyance system, and moving the acquired object toward an identified processing container using the programmable motion device.

In accordance with a further embodiment, the invention provides a processing system for processing objects using a programmable motion device. The processing system includes an input conveyance system by which input bins of objects may be provided to a plurality of processing stations, each processing station including a programmable motion device that includes an end effector for grasping an object, a perception unit at each processing station for perceiving identifying indicia representative of an identity of a plurality of objects at an input area of the input conveyance system, a routing system at each processing station for causing an identified processing container to be directed toward the programmable motion device of the processing station such that an object may be deposited in the identified processing container by the end effector of the programmable motion device, said identified processing container being associated with the identifying indicia and said identified processing container being provided as one of a plurality of processing containers, and an output conveyance system in communication with each processing station, by which processing containers that contain processed objects may be provided.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides a method of processing objects using a programmable motion device. The method includes the steps of perceiving identifying indicia representative of an identity of a plurality of objects and directing the plurality of objects toward an input area from at least one input conveyance system, acquiring an object from the plurality of objects at the input area using an end effector of the programmable motion device, and moving the acquired object toward an identified processing location using the programmable motion device, said identified processing location beings associated with the identifying indicia and said identified processing location being provided as one of a plurality of processing locations.

In accordance with various embodiments, systems of the invention benefit from homogeneity; either the input bins on the loop are homogeneous, or the input bins at the station are homogeneous. This way, the system does not need to wait for the correct bin to come to the station. In the forward case the system knows exactly which outgoing bins are needed at the station, because all the objects in the at-station-bin are the same, and one needs to distribute to a subset of outgoing boxes. Or, the at-station-bin is outgoing, and one knows exactly which bins to pull from the loop, for they contain the needed objects for that bin. In various embodiments, therefore, either the input bins may circulate, or the processing containers may circulate.

Figure 1:
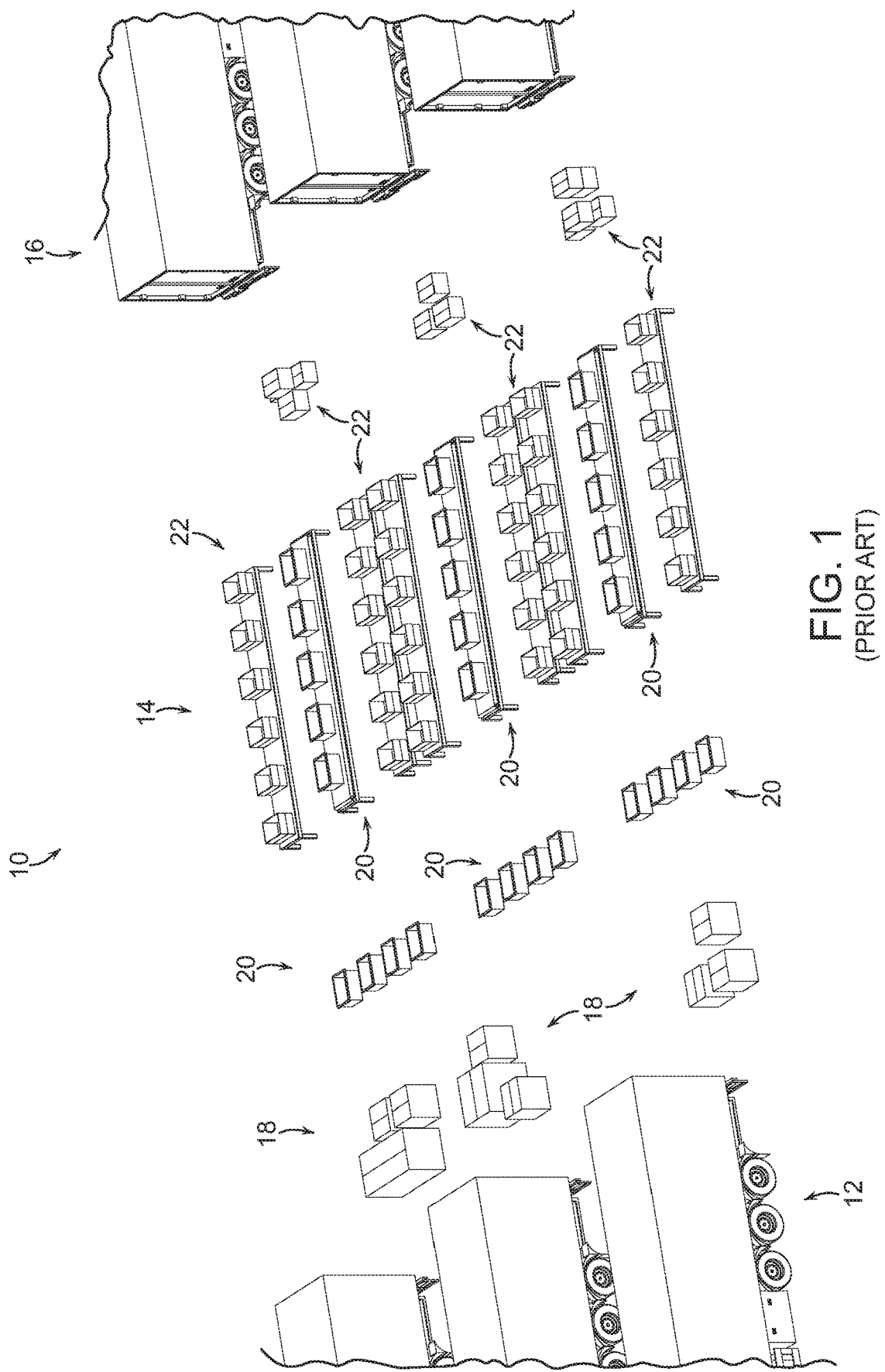
FIG. 1 shows an illustrative diagrammatic view of an object processing system in accordance with the prior art.
Figure 2:
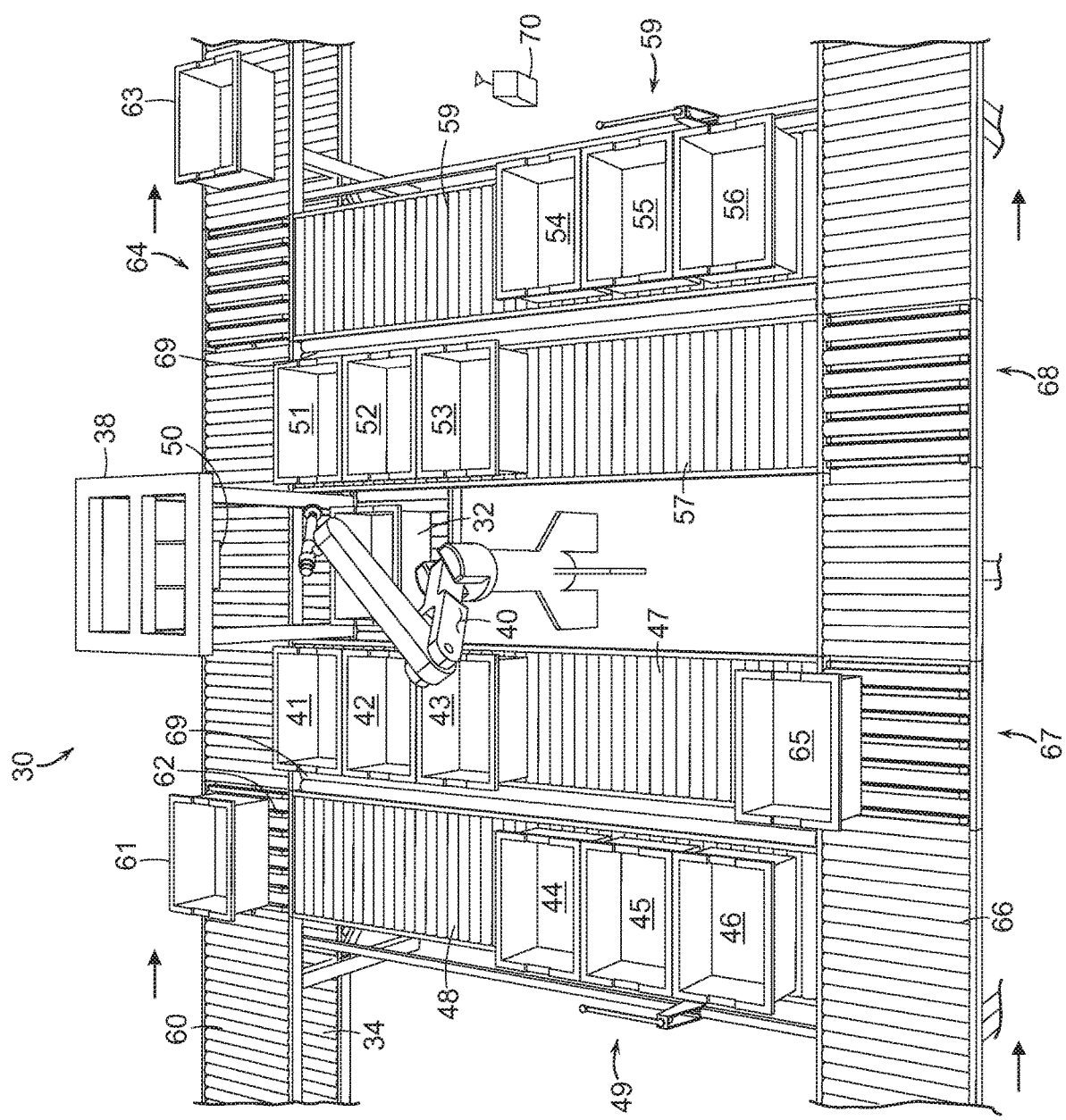
FIG. 2 shows an illustrative diagrammatic view of an object processing system in accordance with an embodiment of the present invention.
Figure 3A:
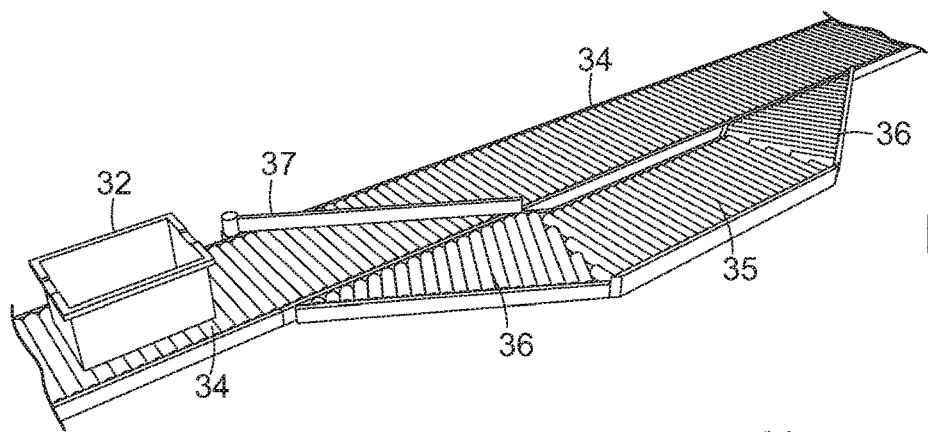
FIGS. 3A-3D show illustrative diagrammatic views of an input conveyance system in the system of FIG. 2.
Figure 3B:
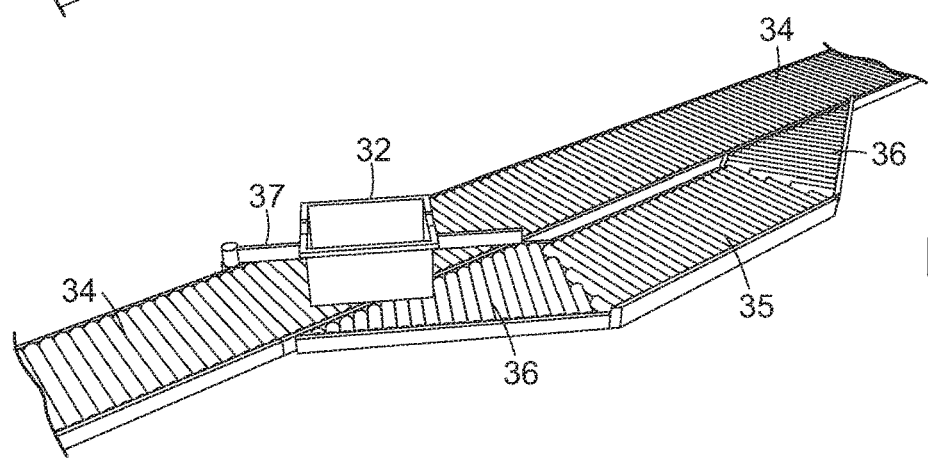
Figure 3C:
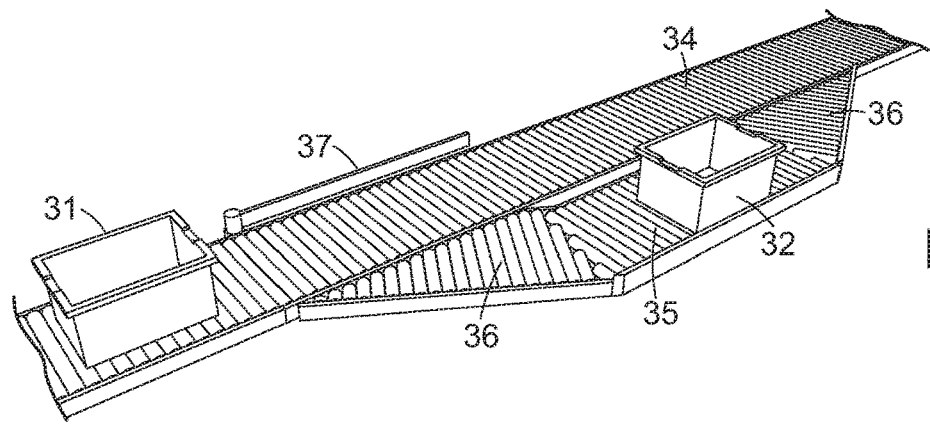
Figure 3D:
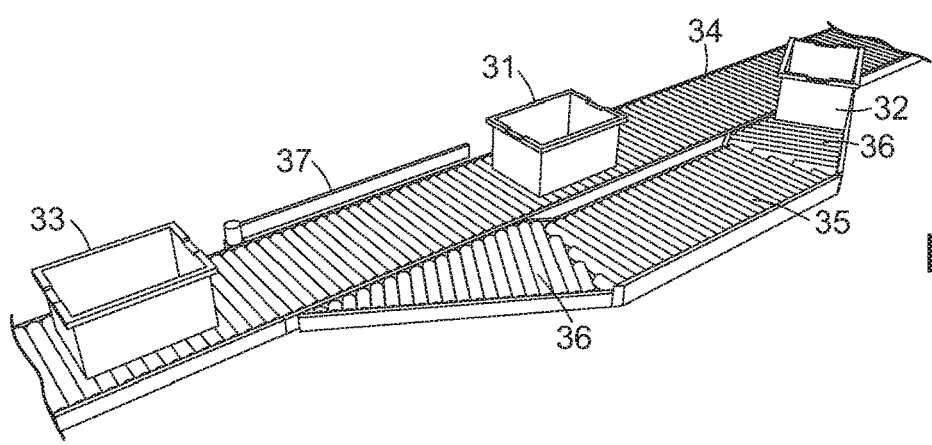
Figure 4:
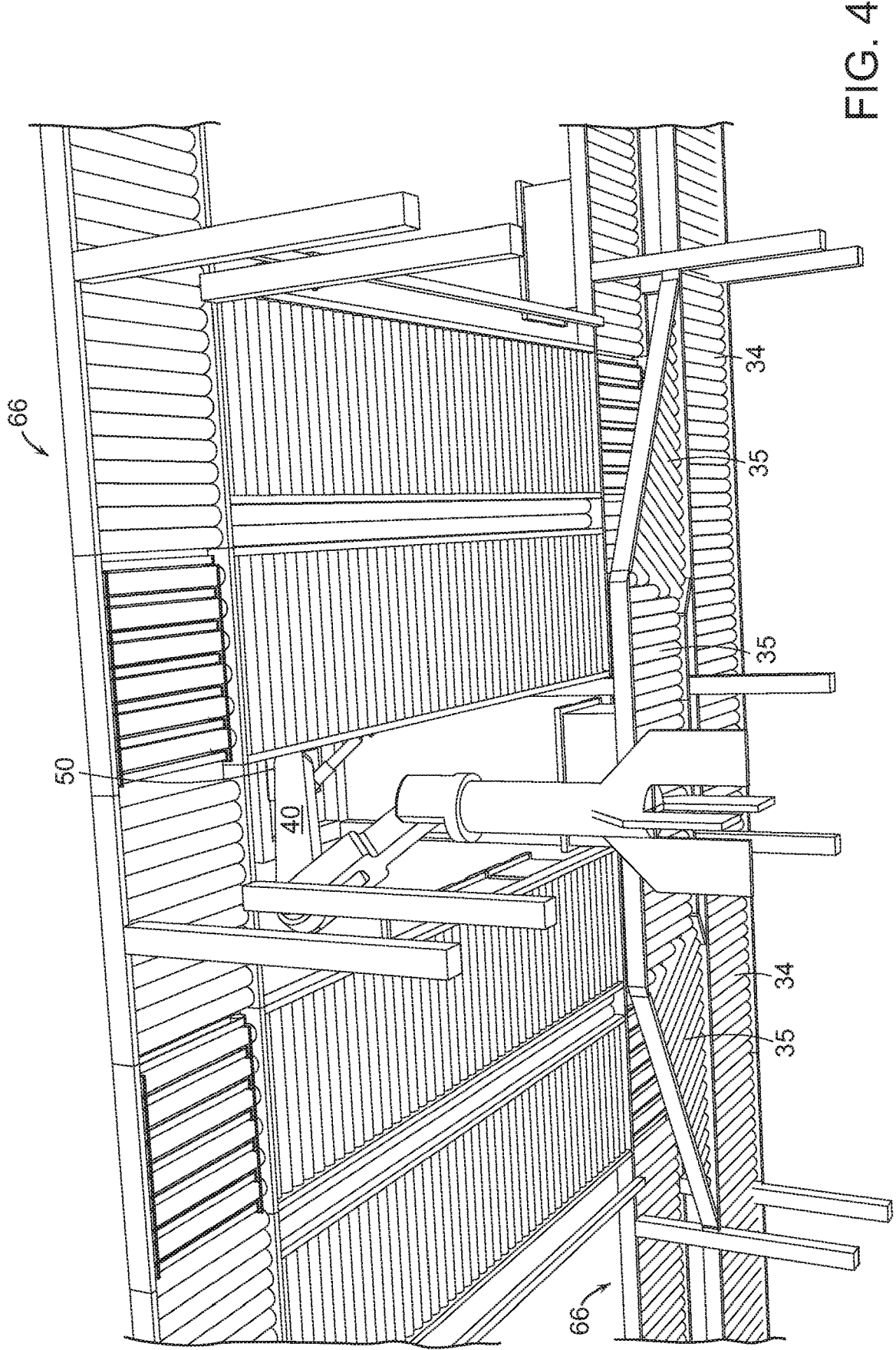
FIG. 4 shows an illustrative diagrammatic underside view of the system of FIG. 2.

FIG. 2, for example, shows a processing system 30 in accordance with an embodiment of the present invention that includes an in-feed conveyor 34 (such as may be coupled to an automated storage and retrieval system (ASRS)) on which a source container 32 may be provided to the processing station 30 as shown in FIGS. 3A and 4. The in-feed conveyor 34 is provided under a processed containers conveyor 60, and as further shown in FIG. 3B, the in-feed conveyor 34 may include a diverter 37 that selectively diverts the container 32 onto an input area 35 of the in-feed conveyor 34 as shown in FIG. 3C. Rails 36 on the conveyors of the input area 35 may also facilitate maintaining the source container 32 on the conveyors of the input area, and facilitate the re-direction of the container 32 back onto the in-feed conveyor 34 as shown in FIG. 3D.

As further shown in FIG. 4, the input area 35 of the in-feed conveyor 34 positions the source container 32 at a location such that it is within a perception area of a perception unit 50 (mounted on a frame 38), and such that it is accessible by a programmable motion device 40. Each of the in-feed conveyor 34 and the conveyors at the input area 35, may be independently actuatable, permitting the source container 32 to remain in the input area 35 as long as it is need for object processing, while other stock containers 31, 33 continue along the in-feed container 34 either continuously or intermittently.

With reference again to FIG. 2, the processing station 30 includes an empty container conveyor 66 on which empty containers 65 may be selectively provided to the processing station via bi-directional rollers 67, 68 to one of two inner conveyors 47, 57 that are adjacent the programmable motion device 40. Outside of the inner conveyors (further from the programmable motion device 40), are outer conveyors 48, 58, which communicate with the processed containers conveyor 60 via bi-directional conveyors 62, 64.

The inner conveyors 47, 57 may receive an empty container (e.g., 65) from the empty container conveyor 66, and each processing station 30 provides that the programmable motion device 40 retrieves individual objects from the source container 32, and provides the objects to one of a small number of active processing containers 41, 42, 43, 44, 45, 46, 51, 52, 53, 54, 55, 56. One set of the processing containers 41-43 is provided on inner conveyor 47 and another set of processing containers 51-53 is provided on inner conveyor 57. As shown in FIG. 2, a further set of the processing containers 44-46 is provided on outer conveyor 48 and another set of processing containers 54-56 is provided on outer conveyor 58.

During use, a first set of processing containers (41, 42, 43) and second set of processing containers (51, 52, 53) that are provided on inner conveyors 47, 57 and are readily accessed by the programmable motion device 40 (e.g., a robot). Objects from the source container 32 are distributed to the processing containers (41, 42, 43, 51, 52, 53) as may be need in accordance with a manifest. Two further sets of processing containers (44, 45, 46) and (54, 55, 56) are provided on outer conveyors and may be selectively moved to the inner conveyors through the use of container kickers 49, 59, as well as one of a single or pair of rollers 69 as discussed further below. The system, therefore, provides that six processing containers may be immediately accessed, and that six more processing containers may be readily brought to the robot 40. While the processing station 30 may receive a wide range of source containers via the in-feed conveyor 34, the processing of a smaller number of processing containers near the robot, with another small number readily accessible, provides significant economies. The processing containers may be moved between the inner and outer conveyors until a container is complete, whereupon the container is moved to the processed containers conveyor 60, e.g., using a bi-directional conveyor 62, 64. In certain embodiments, each individual roller on the inner and outer conveyors 47, 48, 57, 58 may be individually actuatable, permitting one container to be moved on a conveyor without moving all of the containers on the conveyor.

FIG. 4 shows the underside of the processing station 30, in which it may be seen that the in-feed conveyor 34 (under the processed containers conveyor 60) delivers a source container 32 to an input area 35 that is accessible by the robot 40. In various embodiments, the source container may be provided to each processing station in a wide variety of ways.

The containers may be provided as totes, bins, boxes, box tray assemblies or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

It is assumed that the bins of objects are marked in one or more places on their exterior with a visually distinctive mark such as a barcode (e.g., providing a UPC code) or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects.

The operations of the system described above are coordinated with a central control system 70 as shown in FIGS. 2-4 that communicates (e.g., wirelessly) with the programmable motion device 40, the perception unit 50, the conveyors 34, 47, 48, 57, 58, 60, 66, 69, all diverters (e.g., 37), bi-directional conveyors 62, 64, 67, 68 and container kickers 49, 59. This system determines from symbol strings the UPC associated with a vendor bin, as well as the outbound destination for each object. The central control system 70 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 5:
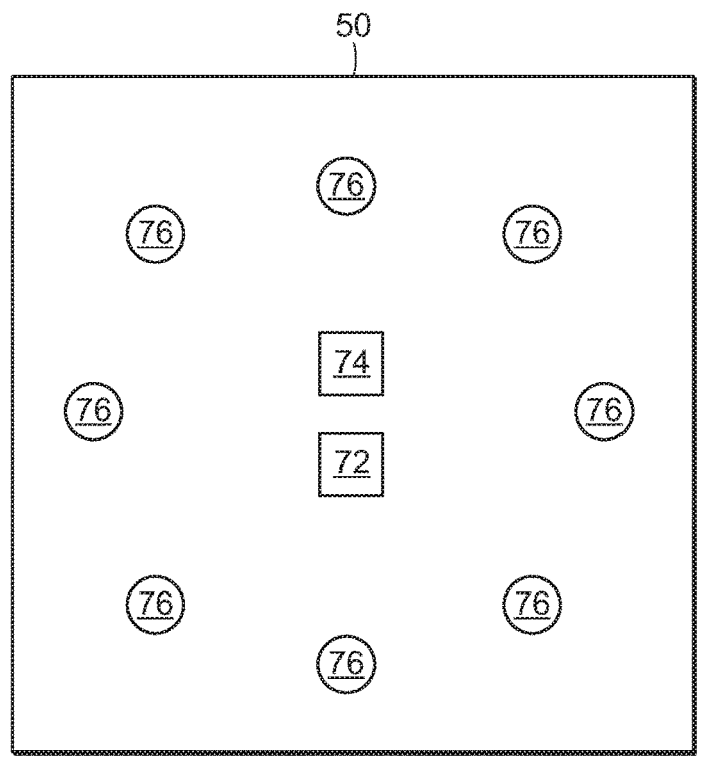
FIG. 5 shows an illustrative diagrammatic view of the perception system of FIGS. 2-4.

As discussed above with reference to FIGS. 2-4, the system of an embodiment includes a perception system (e.g., 50) that is mounted above a bin of objects to be processed near the programmable motion device 40, looking down into a bin 32. The system 50, for example and as shown in FIG. 5, may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 6:
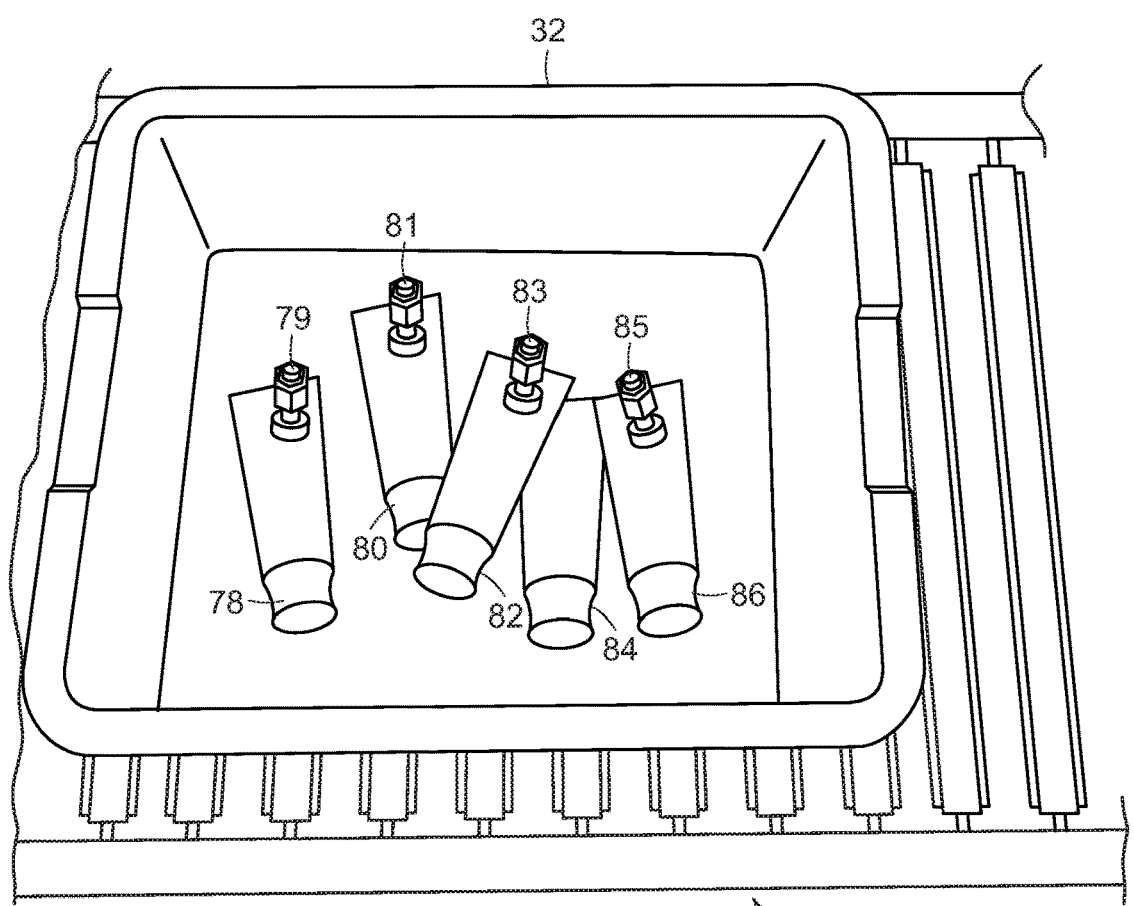
FIG. 6 shows an illustrative diagrammatic view from the perception system of FIGS. 2-4, showing a view of objects within a bin of objects to be processed.

FIG. 6 shows an image view from the perception unit 50. The image view shows a bin 32 in an input area (a conveyor), and the bin 32 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 11. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur (e.g., on the right), or will acquire the object at a grasp location that is very far from the center of mass of the object (e.g., on the left) and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 7A:
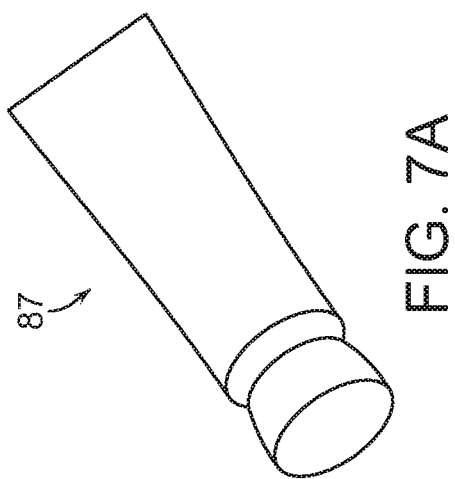
FIGS. 7A and 7B show an illustrative diagrammatic view of a grasp selection process in an object processing system of an embodiment of the present invention.
Figure 7B:
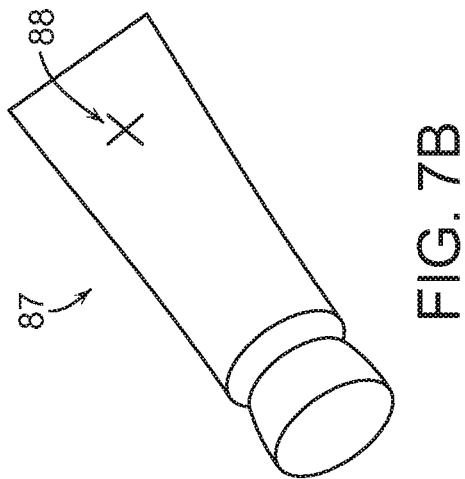

As shown in FIGS. 7A and 7B, the perception system may also identify portions of an object that are the most flat in the generation of good grasp location information. In particular, if an object includes a tubular end and a flat end such as object 87, the system would identify the more flat end as shown at 88 in FIG. 7B. Additionally, the system may select the area of an object where a UPC code appears, as such codes are often printed on a relatively flat portion of the object to facilitate scanning of the barcode.

Figure 9A:
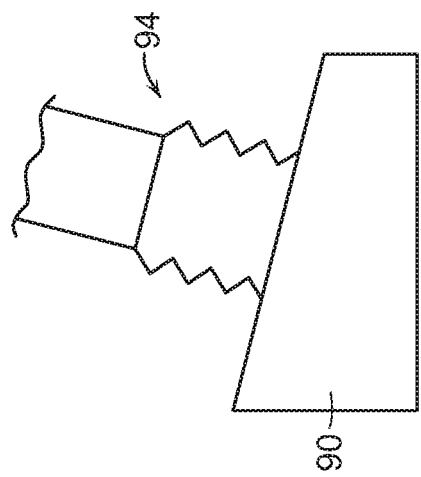
FIGS. 9A and 9B show an illustrative diagrammatic view of a grasp execution process in an object processing system of an embodiment of the present invention.
Figure 9B:
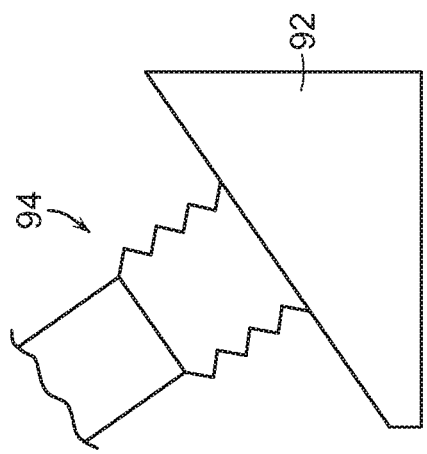
Figure 8A:
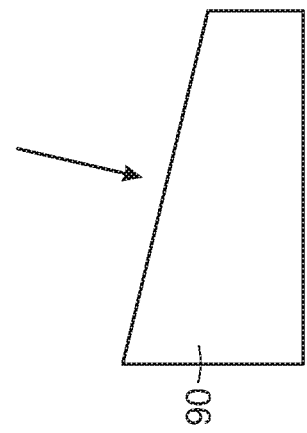
FIGS. 8A and 8B show an illustrative diagrammatic view of a grasp planning process in an object processing system of an embodiment of the present invention.
Figure 8B:
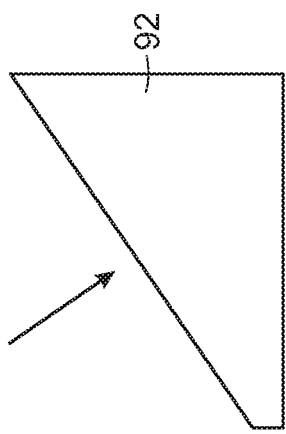

FIGS. 8A and 8B show that for each object 90, 92, the grasp selection system may determine a direction that is normal to the selected flat portion of the object 90, 92. As shown in FIGS. 9A and 9B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical or gantry picks), and that such grasp points may be chosen using fiducial features as grasp points, such as picking on a barcode, given that barcodes are almost always applied to a flat spot on the object.

In accordance with various embodiments therefore, the invention further provides a processing system that may learn object grasp locations from experience (and optionally human guidance). Systems designed to work in the same environments as human workers will face an enormous variety of objects, poses, etc. This enormous variety almost ensures that the robotic system will encounter some configuration of object(s) that it cannot handle optimally; at such times, it is desirable to enable a human operator to assist the system and have the system learn from non-optimal grasps.

The system optimizes grasp points based on a wide range of features, either extracted offline or online, tailored to the gripper's characteristics. The properties of the suction cup influence its adaptability to the underlying surface, hence an optimal grasp is more likely to be achieved when picking on the estimated surface normal of an object rather than performing vertical gantry picks common to current industrial applications.

In addition to geometric information the system uses appearance based features as depth sensors may not always be accurate enough to provide sufficient information about graspability. For example, the system can learn the location of fiducials such as barcodes on the object, which can be used as indicator for a surface patch that is flat and impermeable, hence suitable for a suction cup. One such example is the use of barcodes on consumer products. Another example is shipping boxes and bags, which tend to have the shipping label at the object's center of mass and provide an impermeable surface, as opposed to the raw bag material, which might be slightly porous and hence not present a good grasp.

By identifying bad or good grasp points on the image, a correlation is established between features in the 2D/3D imagery and the idea of good or bad grasp points; using this data and these correlations as input to machine learning algorithms, the system can eventually learn, for each image presented to it, where to grasp and where to avoid.

This information is added to experience based data the system collects with every pick attempt, successful or not. Over time the robot learns to avoid features that result in unsuccessful grasps, either specific to an object type or to a surface/material type. For example, the robot may prefer to avoid picks on shrink wrap, no matter which object it is applied to, but may only prefer to place the grasp near fiducials on certain object types such as shipping bags.

This learning can be accelerated by off-line generation of human-corrected images. For instance, a human could be presented with thousands of images from previous system operation and manually annotate good and bad grasp points on each one. This would generate a large amount of data that could also be input into the machine learning algorithms to enhance the speed and efficacy of the system learning.

In addition to experience based or human expert based training data, a large set of labeled training data can be generated based on a detailed object model in physics simulation making use of known gripper and object characteristics. This allows fast and dense generation of graspability data over a large set of objects, as this process is not limited by the speed of the physical robotic system or human input.

The system of an embodiment may also employ motion planning using a trajectory database that is dynamically updated over time, and is indexed by customer metrics. The problem domains contain a mix of changing and unchanging components in the environment. For example, the objects that are presented to the system are often presented in random configurations, but the target locations into which the objects are to be placed are often fixed and do not change over the entire operation.

One use of the trajectory database is to exploit the unchanging parts of the environment by pre-computing and saving into a database trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task. In various embodiments, a trajectory path may include any number of changing and unchanging portions that, when combined, provide an optimal trajectory path in an efficient amount of time.

Figure 10A:
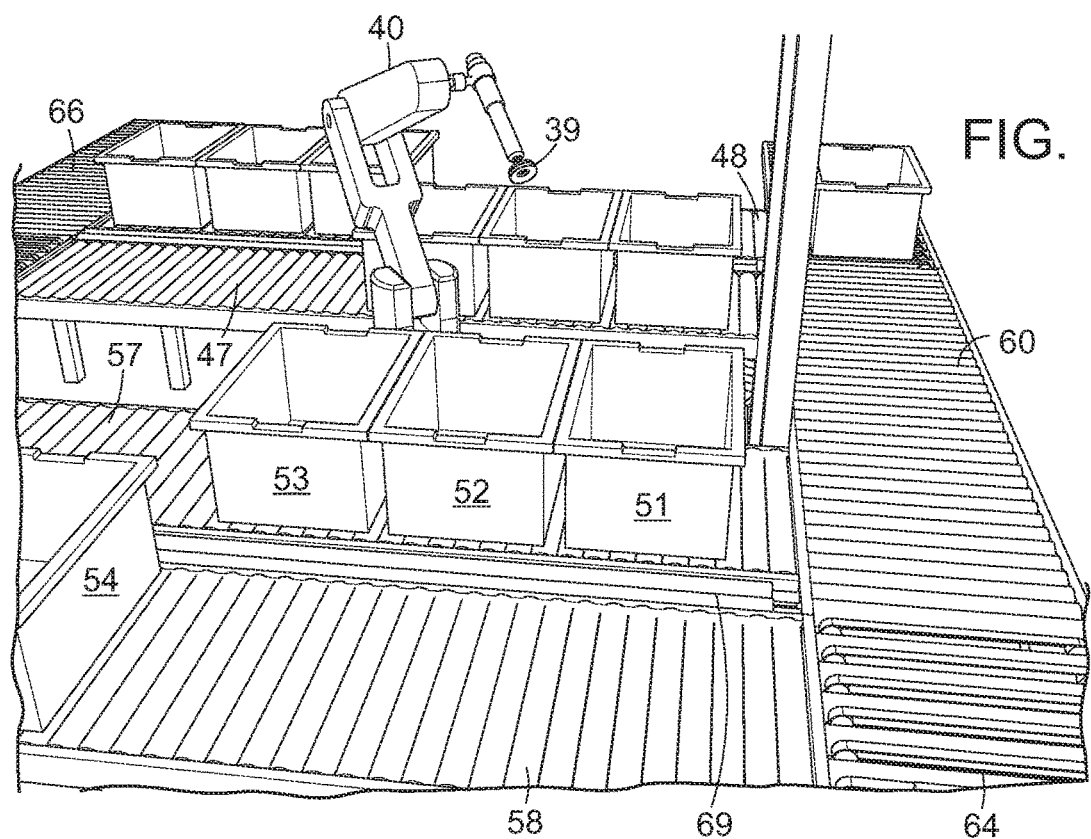
FIG. 10A-10D show illustrative diagrammatic views of the bin processing system of FIGS. 2-4 wherein a bin is moved to an outer processing conveyor.
Figure 10B:
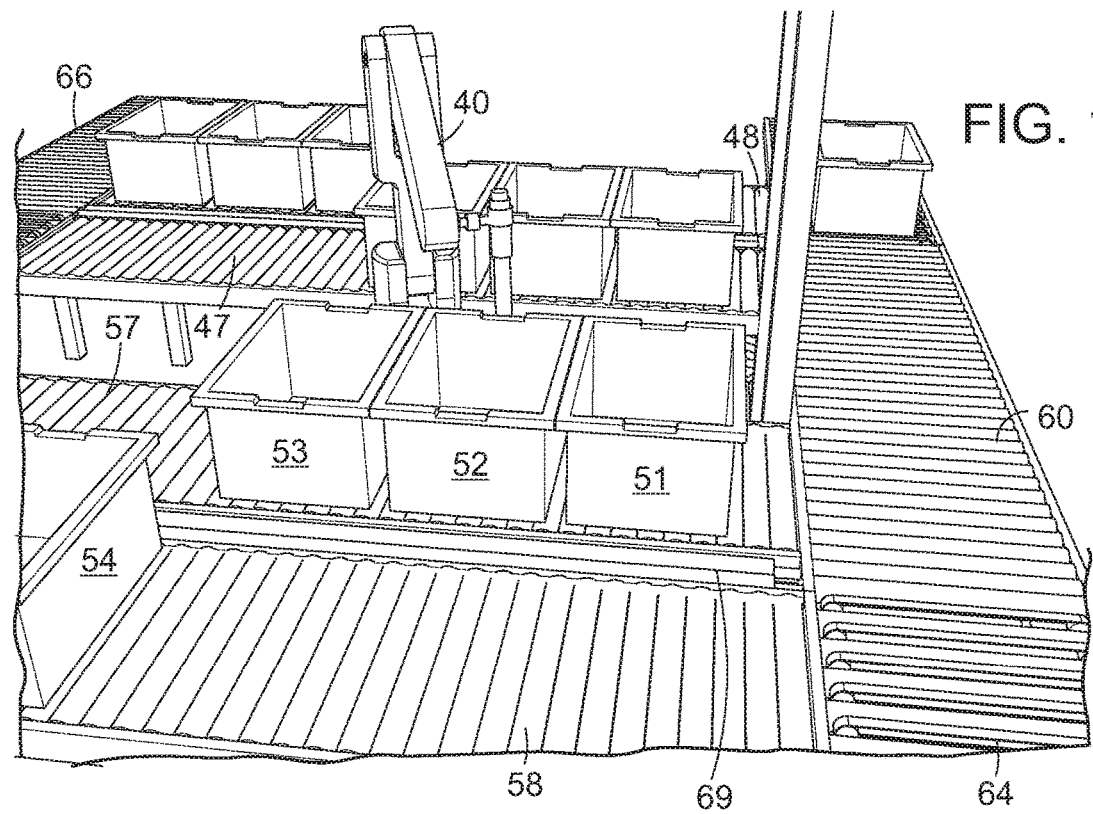
Figure 10C:
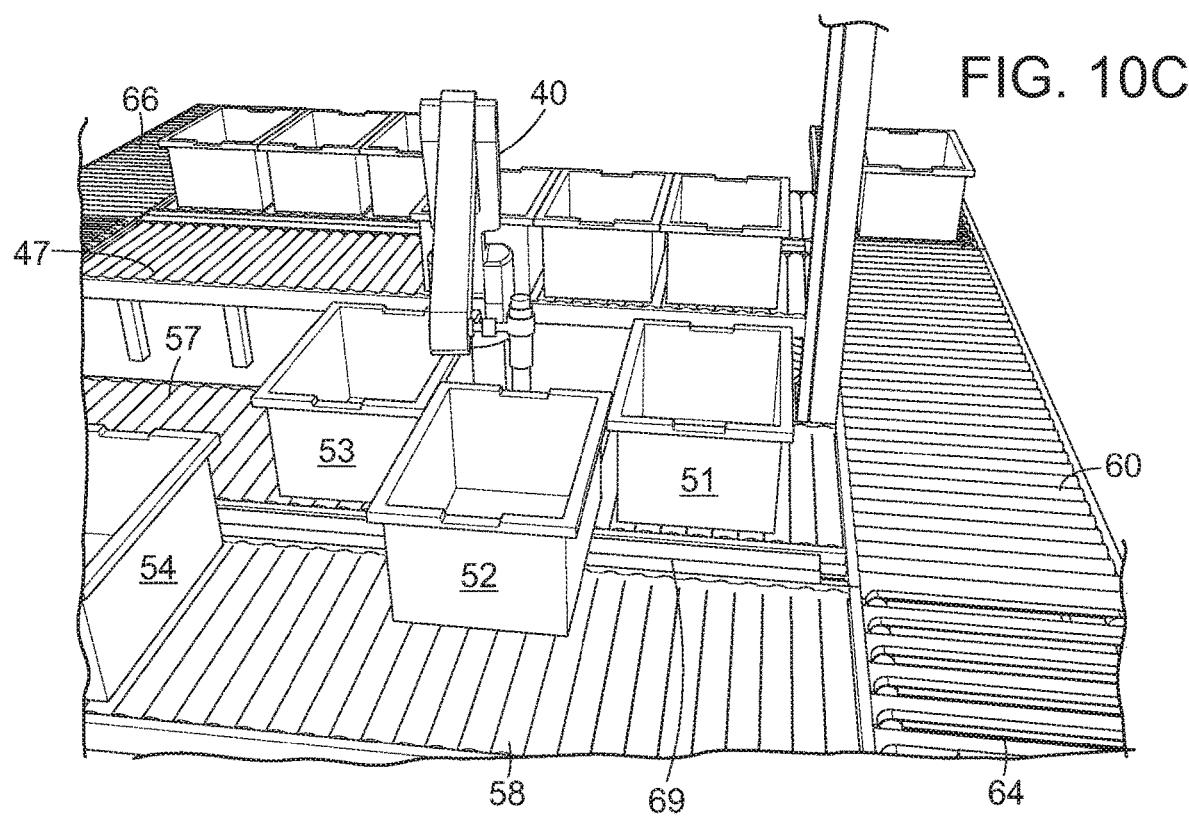
Figure 10D:
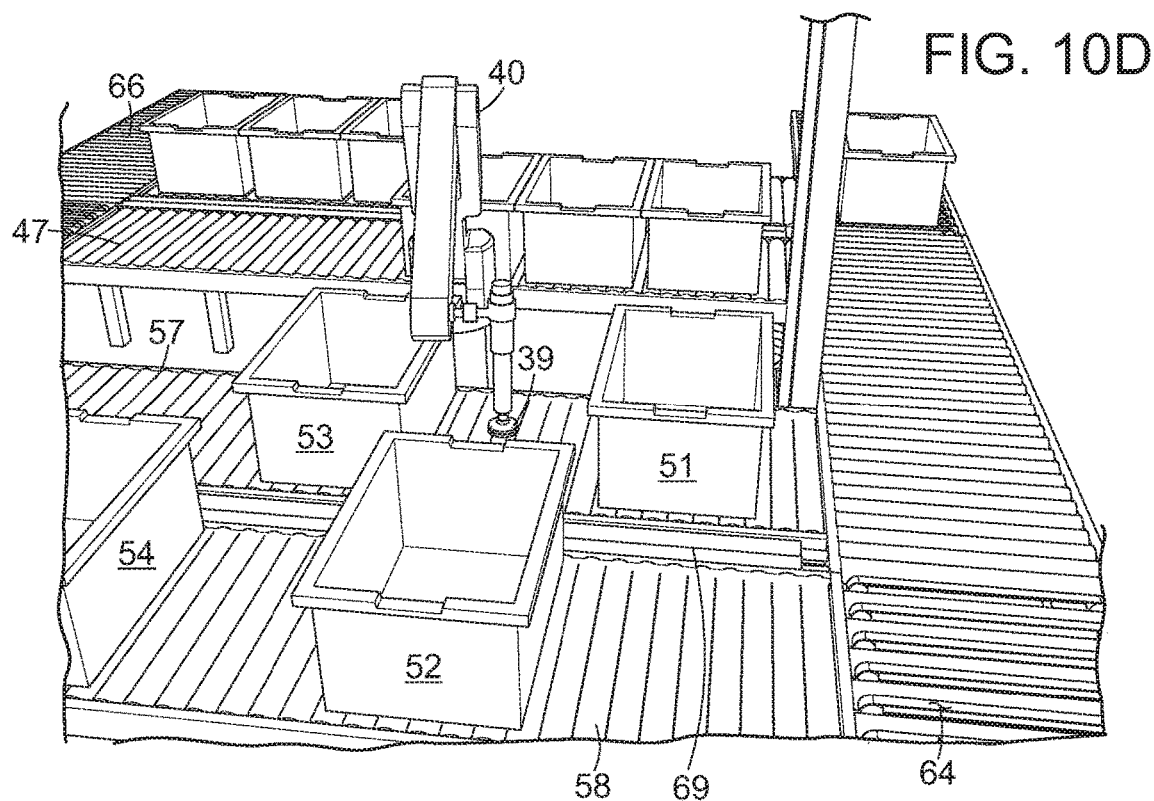

FIGS. 10A-10D show a processed container being moved from an inner conveyor to an outer conveyor, which is done by the programmable motion device 40. In particular, if a processing container, e.g., 52 (as shown in FIG. 10A), is selected to be moved from an inner conveyor 57 to an outer conveyor 58, the programmable motion device 40 positions itself such that the end effector 39 is behind the processing container 52 as shown in FIG. 10B. The programmable motion device 40 then pushes the container 52 off of the inner conveyor 57 as shown in FIG. 10C. One or more rollers 69 facilitate the transfer by rolling in the direction or movement from the inner conveyor to the outer conveyor. The container 52 then stops when it is received on the outer conveyor 58 as shown in FIG. 10D. A processing container may be moved from an inner conveyor to an outer conveyor either to make room for a different processing container to be brought close to the robot 40, or because the processing container is finished being loaded with objects. The processed containers may be provided to the processed containers conveyor 60 by a bi-direction conveyor (e.g., 62, 64), or in certain embodiments, the processed container may be moved directly onto the processed containers conveyor 60 directly from the inner conveyor (e.g., 47, 57).

Figure 11A:
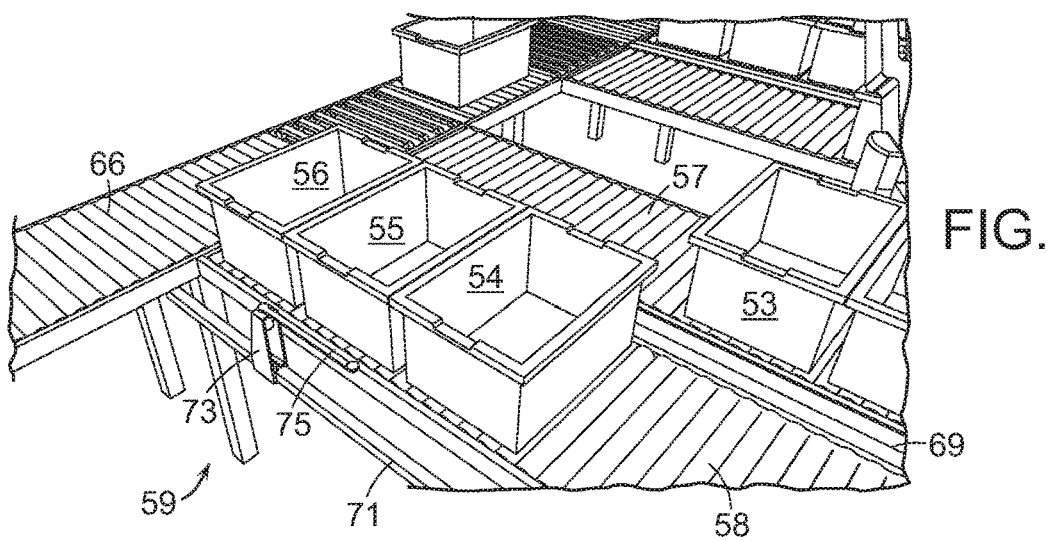
FIGS. 11A-11E show illustrative diagrammatic views of another bin processing system of FIGS. 2-4 wherein a bin is moved to an input processing conveyor.
Figure 11B:
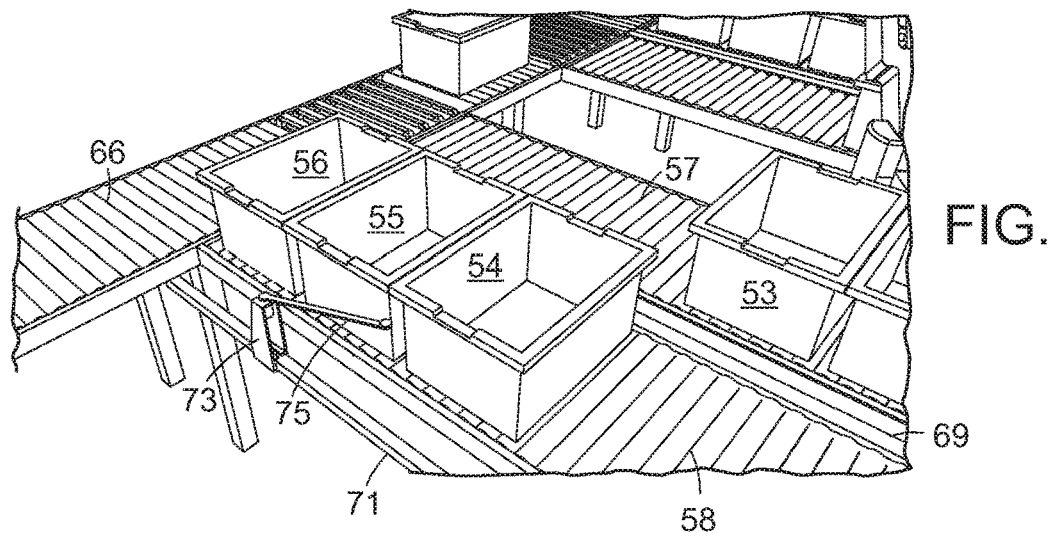
Figure 11C:
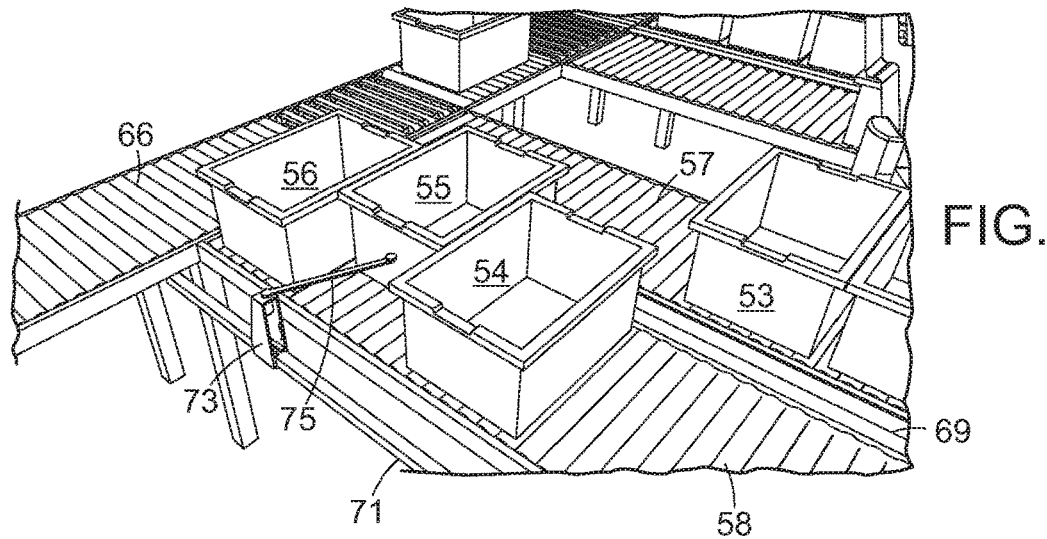
Figure 11D:
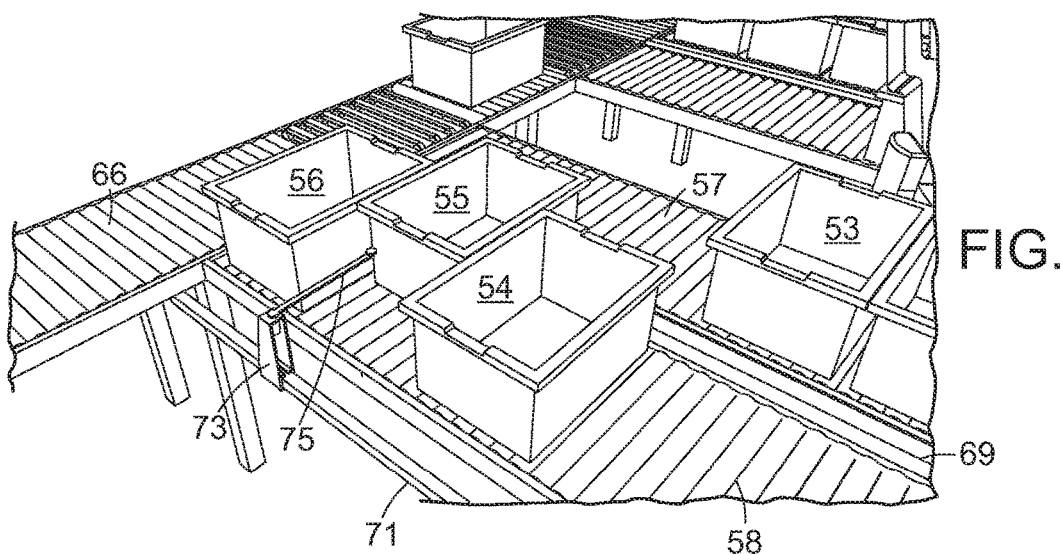
Figure 11E:
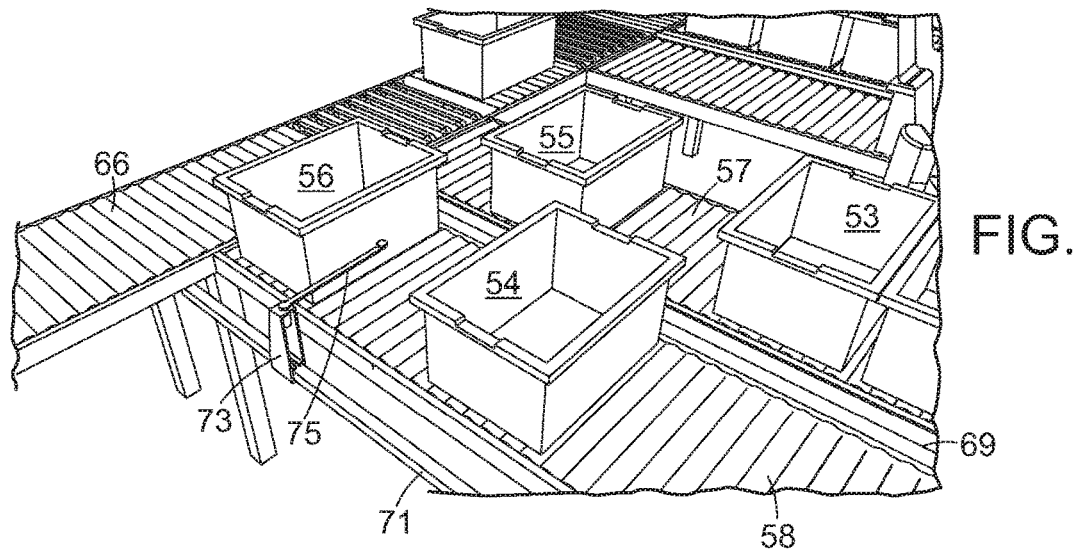

FIGS. 11A-11E show the use of a container kicker for urging a processing container from an outer conveyor to an inner conveyor. In particular, the container kicker 59 includes a track 71 along which a kicker unit 73 may reciprocally travel in order to position the kicker unit 73 behind a container to be moved (as shown in FIG. 11A). Once positioned behind a processing container (e.g., 55) that is selected to be moved from the outer conveyor 58 to the inner conveyor 57, an arm 75 of the container kicker rotates, contacting the processing container 55 as shown in FIG. 55. The arm rotates ninety degrees, pushing the container 55 (as shown in FIGS. 11C and 11D), pushing the container 55 onto the single or double rollers 69, which are activated to urge the container 55 toward the inner conveyor 57. The roller(s) 69 then continue to move the processing container 55 onto the inner conveyor 57 as shown in FIG. 11E. The arm 75 of the container kicker 59 is then rotated back to its initial position (shown in FIG. 11A). The processing containers 41-46 and 51-56 may therefore be readily move to and from the robot 40.

Figure 12:
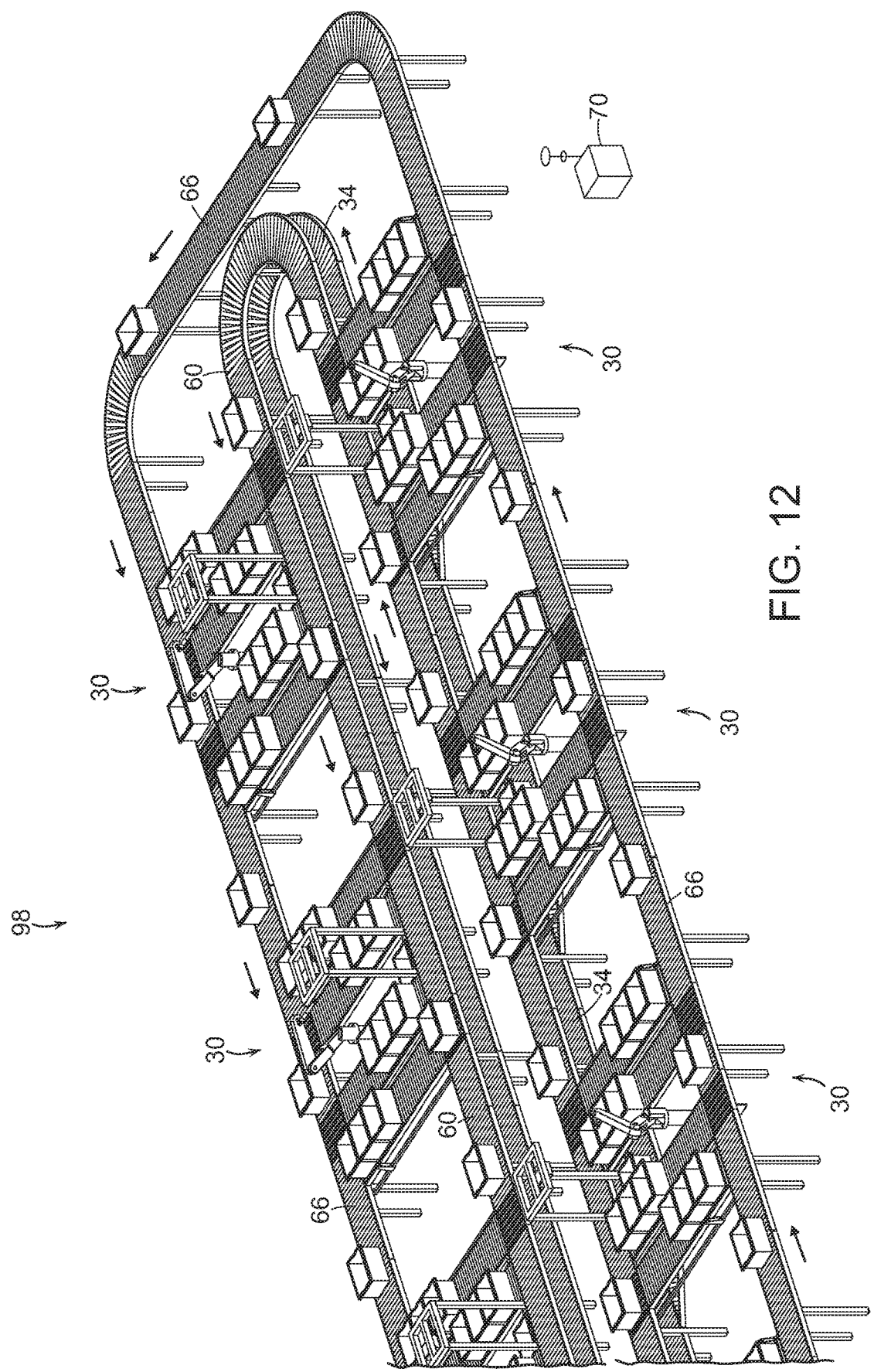
FIG. 12 shows an illustrative diagrammatic view of a processing system in accordance with an embodiment of the invention that includes a plurality of object processing systems of FIG. 2.

The processing station 30 may be included in a system that includes a large number of processing stations, and the plurality of processing stations may be in communication with common conveyors for in-feed, for providing the empty containers, and for receiving processed containers. FIG. 12, for example, shows a system 98 that includes a plurality of processing stations 30, each of which is in communication a common in-feed conveyor 34, a common empty processing containers conveyor 66, and a common processed containers (output) conveyor 60 as discussed above. Each of the processing stations 30 includes the elements of the systems discussed above and operates as discussed above.

Again, the containers may be provided as boxes, totes, bins or any other type of device that may receive and hold an item. In further embodiments, the containers may be provided as box tray assemblies. Such box tray assemblies may include uniform trays (to provide consistency of spacing and processing) and may further include open covers that may maintain the bin in an open position, and may further provide consistency in processing through any of spacing, alignment, or labeling.

Figure 13:
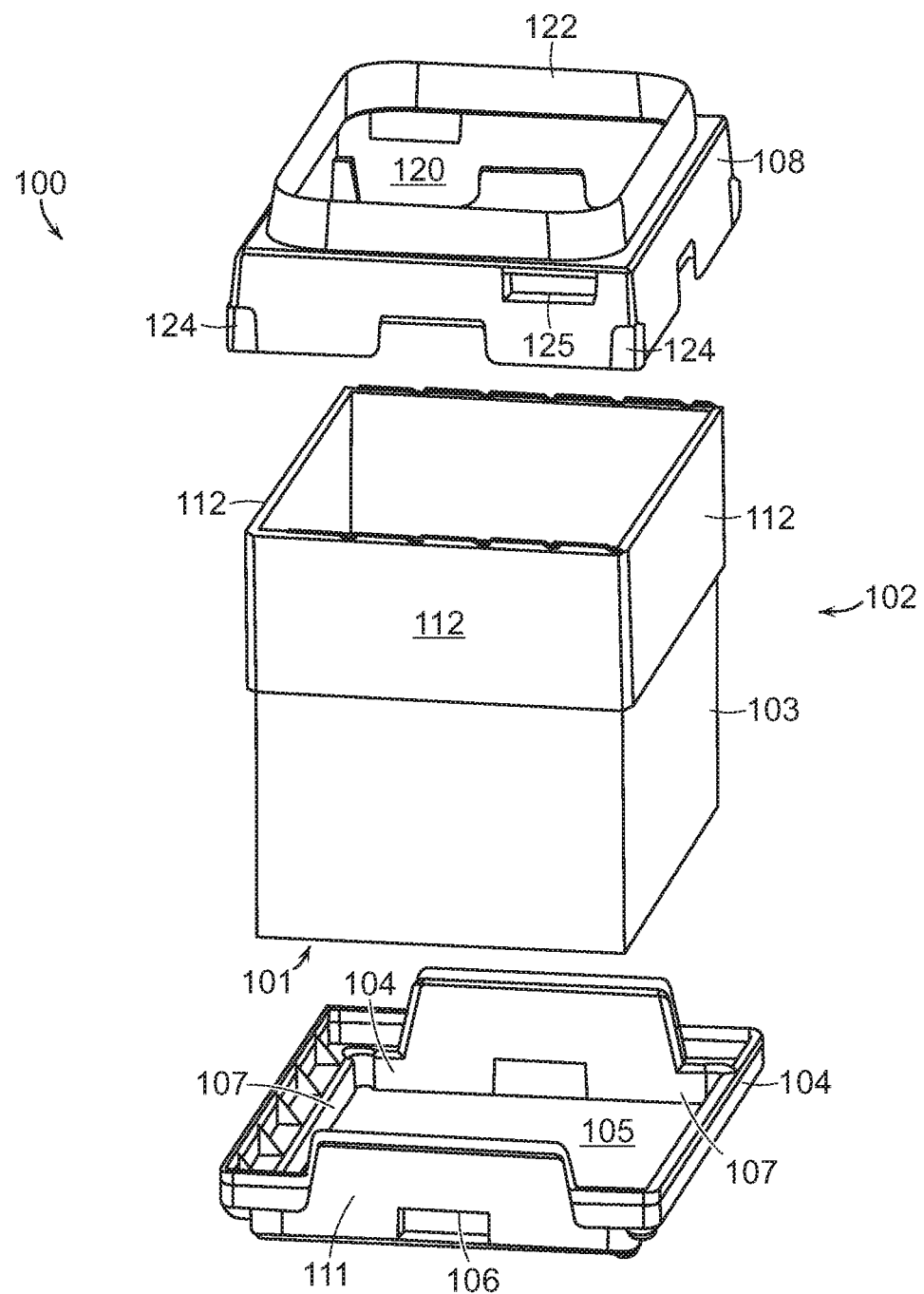
FIG. 13 shows an illustrative diagrammatic exploded view of a box tray assembly for use in accordance with an embodiment of the present invention.

For example, FIG. 13 shows an exploded view of a box tray assembly 100. As shown, the box 102 (e.g., a standard shipping sized cardboard box) may include bottom 101 and side edges 103 that are received by a top surface 105 and inner sides 107 of a box tray 104. The box tray 104 may include a recessed (protected) area 106 in which a label or other identifying indicia may be provided, as well as a wide and smooth contact surface 111 that may be engaged by an urging or removal mechanism (kicker) as discussed above.

As also shown in FIG. 13, the box 102 may include top flaps 112 that, when opened as shown, are held open by inner surfaces 120 of the box cover 108. The box cover 108 may also include a recessed (protected) area 125 in which a label or other identifying indicia may be provided The box cover 108 also provides a defined rim opening 122, as well as corner elements 124 that may assist in providing structural integrity of the assembly, and may assist in stacking un-used covers on one another. Un-used box trays may also be stacked on each other.

Figure 14:
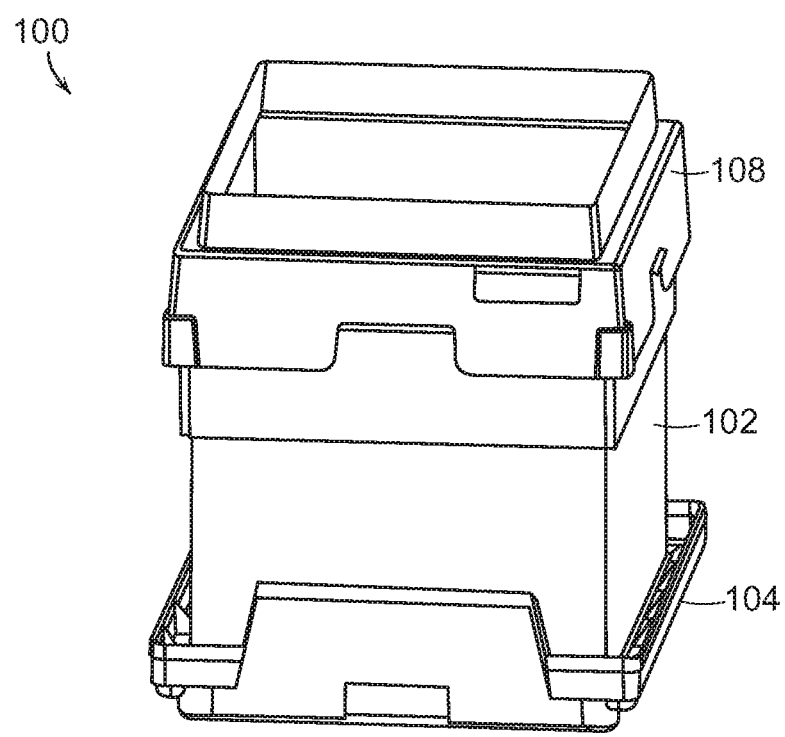
FIG. 14 shows an illustrative diagrammatic view of the box tray assembly of FIG. 13.

The box 102 is thus maintained securely within the box tray 104, and the box cover 108 provides that the flaps 112 remain down along the outside of the box permitting the interior of the box to be accessible through the opening provided by rim 122 in the box cover 108. FIG. 14 shows a width side view of the box tray assembly 100 with the box 102 securely seated within the box tray 104, and the box cover 108 holding open the flaps 112 of the box 102. The box tray assemblies may be used as any or both of the storage bins and destination bins in various embodiments of the present invention.

Overall trajectories of movement of the end effector may include any number of changing and unchanging sections. For example. networks of unchanging trajectory portions may be employed as commonly used paths (roads), while changing portions may be directed to moving objects to a close-by unchanging portion (close road) to facilitate moving the object without requiring the entire route to be planned. For example, the programmable motion device (e.g., a robot) may be tasked with orienting the grasped object in front of an automatic labeler before moving towards the destination. The trajectory to sort the object therefore, would be made up of the following trajectory portions. First, a grasp pose to a home position (motion planned). Then, from home position to an auto-labeler home (pulled from a trajectory database). Then, from the auto-labeler home to a labelling pose (motion planned). Then, from the labelling pose to an auto-labeler home (either motion planned or just reverse the previous motion plan step). Then, from the auto-labeler home to the intended destination (pulled from the trajectory database). A wide variety of changing and unchanging (planned and pulled from a database) portions may be employed in overall trajectories. In accordance with further embodiments, the object may be grasped from a specific pose (planned), and when the object reaches a destination bin (from the trajectory database), the last step may be to again place the object in the desired pose (planned) within the destination bin.

In accordance with further embodiments, the motion planning may also provide that relatively heavy items (as may be determined by knowing information about the grasped object or by sensing weight—or both—at the end effector) may be processed (e.g., moved in trajectories) and placed in boxes in very different ways than the processing and placement of relatively light objects. Again, the risk verses speed calculations may be employed for optimization of moving known objects of a variety of weights and sizes as may occur, for example, in the processing of a wide variety of consumer products.

Figure 15:
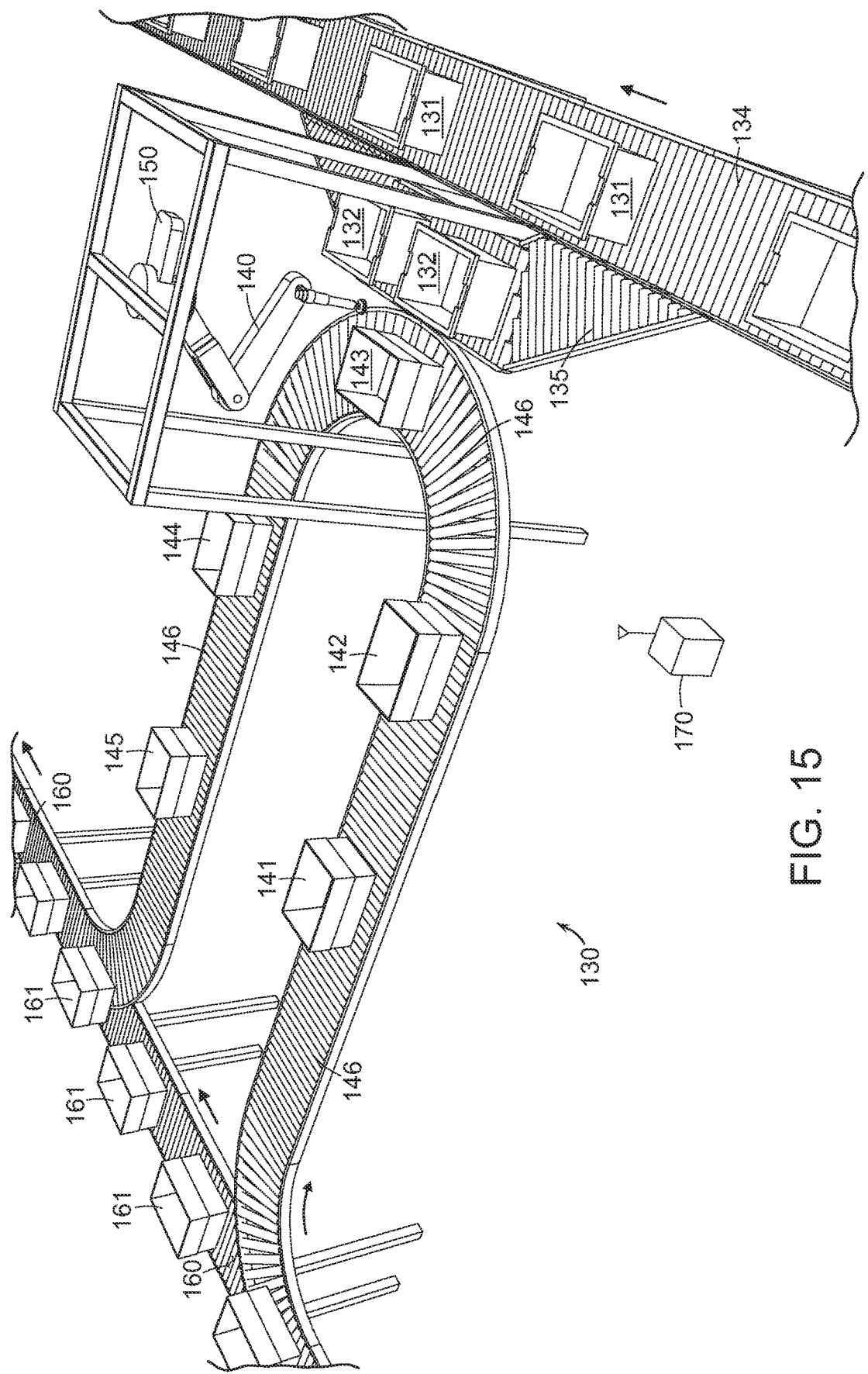
FIG. 15 shows an illustrative diagrammatic view of an object processing system in accordance with another embodiment of the present invention.

FIG. 15 shows a processing station 130 in accordance with another embodiment of the present invention. The processing station 130 includes a programmable motion device 140 (suspended from a frame 138) and a perception unit 150 for viewing into one or more source containers 132. The source containers 132 are provided at an input area 135 that is in communication with an in-feed conveyor 134 on which further source containers 131 are provided. Source containers 132 may be provided to the input area 135, for example using a diverter such as diverter 37 discussed above with reference to FIGS. 3A-3D. A small number of processing containers 141, 142, 143, 144, 145 are provided on a processing section conveyor 146 that is in communication with a processing system conveyor 160 on which further source containers 161 are provided.

Figure 16:
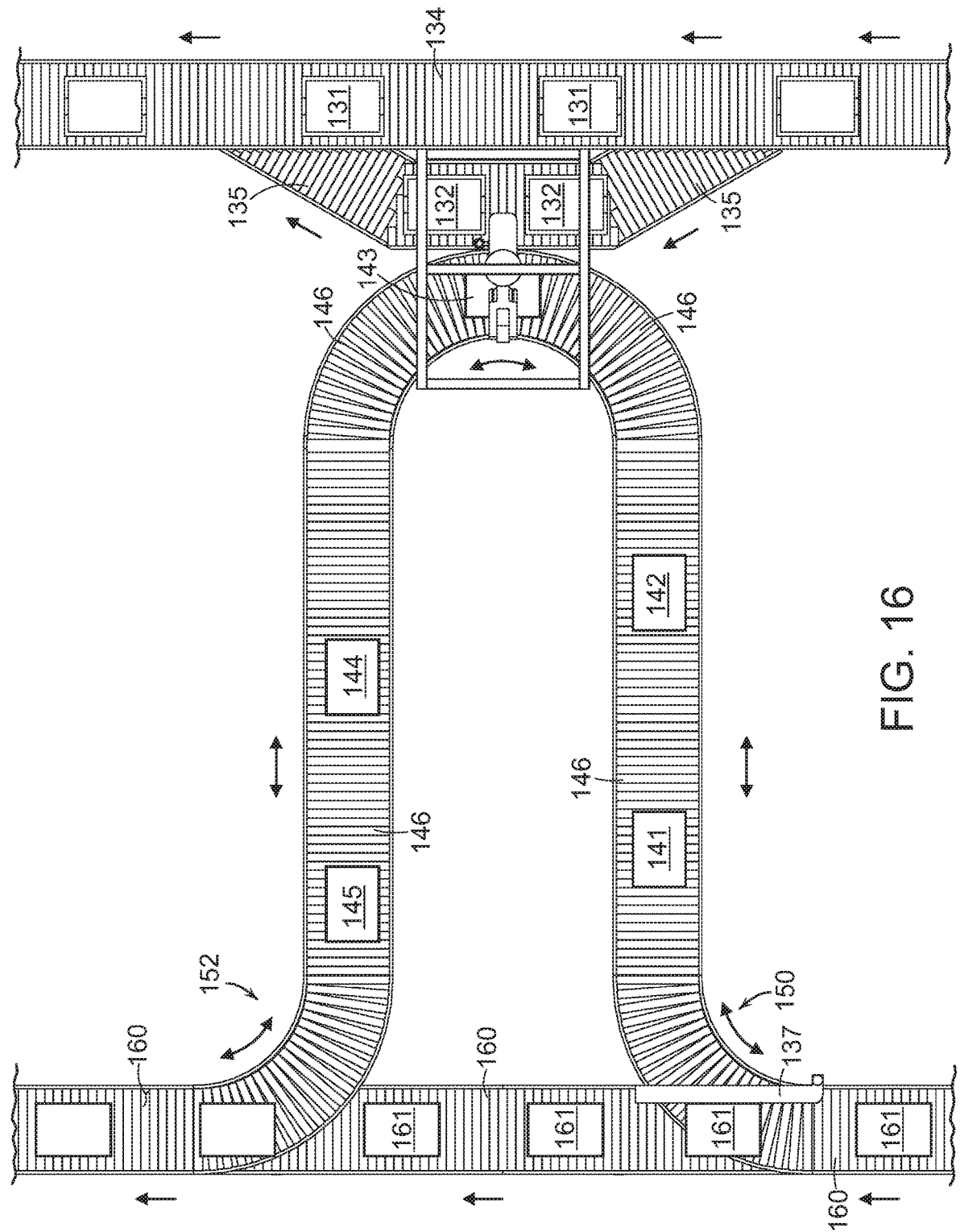
FIG. 16 shows an illustrative diagrammatic top view of the object processing system of FIG. 15.
Figure 17A:
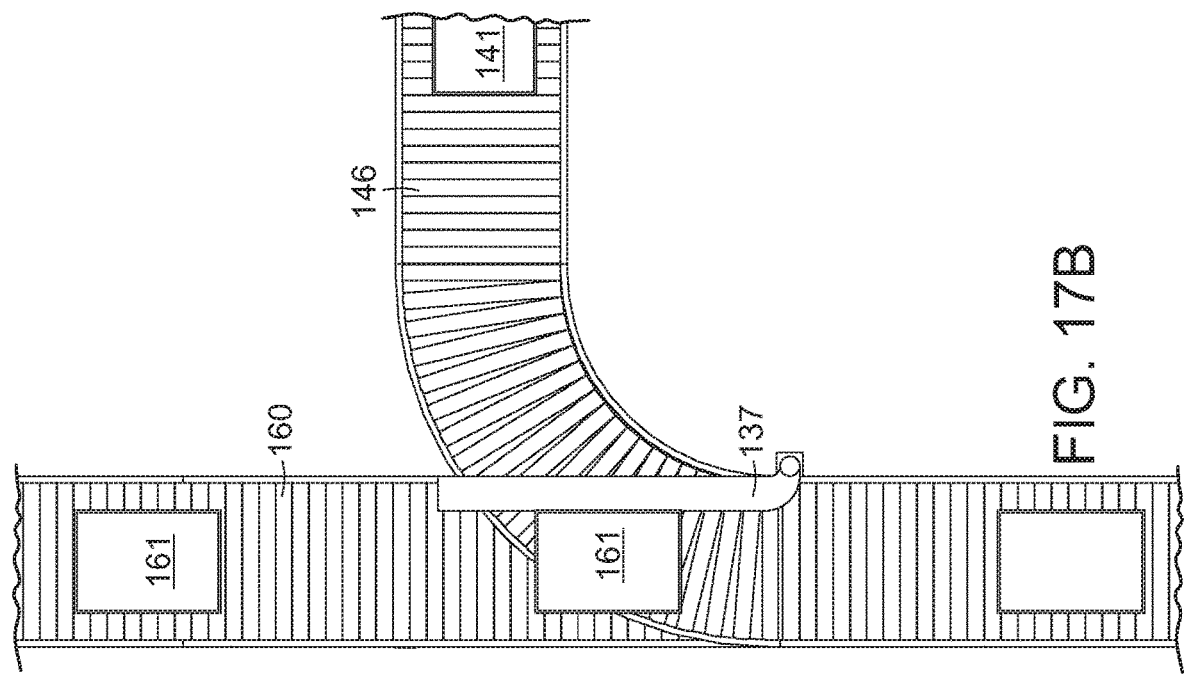
FIGS. 17A and 17B show illustrative diagrammatic views of an input conveyance system in the system of FIG. 15.
Figure 17B:
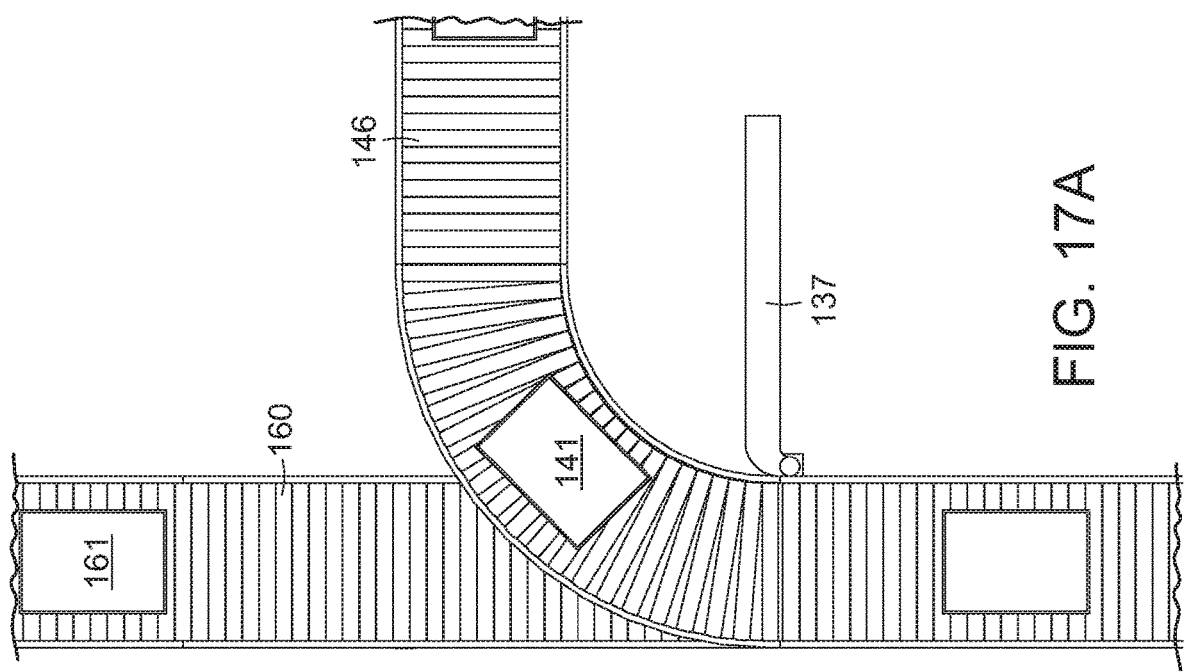

With further reference to FIG. 16, during use, selected processing containers 141, 142, 143, 144, 145 are diverted from the processing system conveyor 160 toward the processing section conveyor 146. FIG. 17A shows a processing container 141 being directed onto the processing station conveyor 146 off of the processing system conveyor 160 (e.g., by the use of tapered rollers as discussed below). As shown in FIG. 17B, when a diverter 137 is actuated, containers (e.g., container 161) moving along the processing system conveyor 160 continued to move along the conveyor 160 and are not diverted onto the processing station conveyor 146.

The rollers of the curved portions of the processing section conveyor 146 may be tapered rollers that provide that a container on the tapered rollers will remain centered on the conveyor as the container travels over the curved portion of the conveyor 146. Further, the rollers on the processing section conveyor (other than the tapered rollers of the curved sections 150, 152) may be individually actuatable and bi-directionally actuatable, providing that that the small number of processing containers (e.g., 141, 142, 143, 144, 145) may be moved independently and bi-directionally on the processing section conveyor 146.

The processing station 130 therefore provides that a small number of processing containers (e.g., 141-145) may be provided adjacent or may be readily moved to be adjacent, the programmable motion device 140. With one or more source containers 132 also being provided adjacent the programmable motion device, objects may readily be processed by moving objects from the source containers 132 to one or more of the processing containers 141-145 in accordance with a manifest. Similar to the system of FIGS. 2-4, objects may therefore be processed by providing a wide variety of objects to a small number of processing containers at each of a plurality of processing stations.

Figure 18:
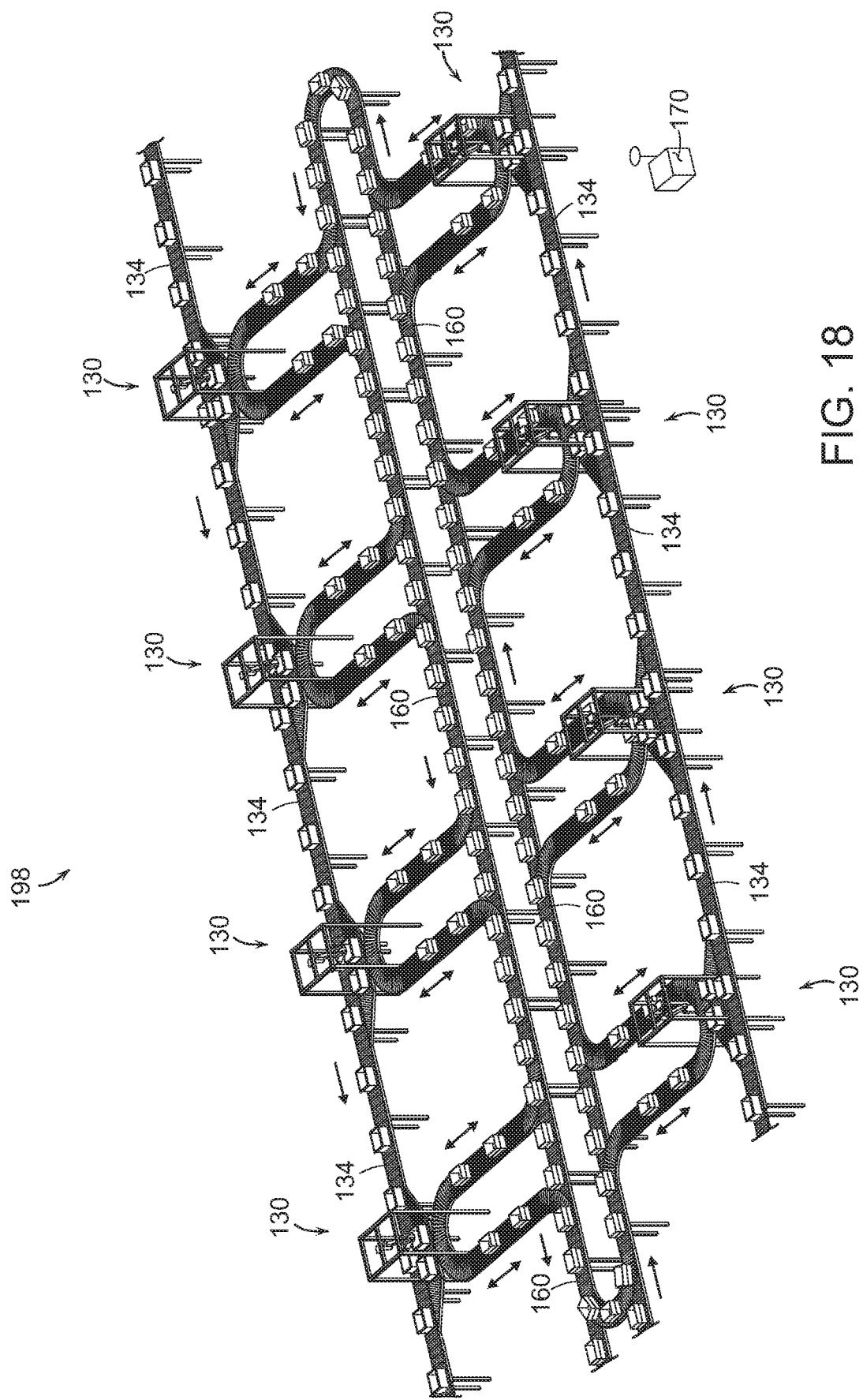
FIG. 18 shows an illustrative diagrammatic view of a processing system in accordance with an embodiment of the invention that includes a plurality of object processing systems of FIG. 15.

FIG. 18 for example, shows a system 190 that includes a plurality of container processing stations 130 as discussed above, wherein each container processing station 130 is in communication with a common in-feed conveyor 134 and a common processing system conveyor 160. In the system of FIG. 18, a wide variety of objects may be processed by providing the objects to a small number of processing containers at each of a plurality of processing stations.

Figure 19:
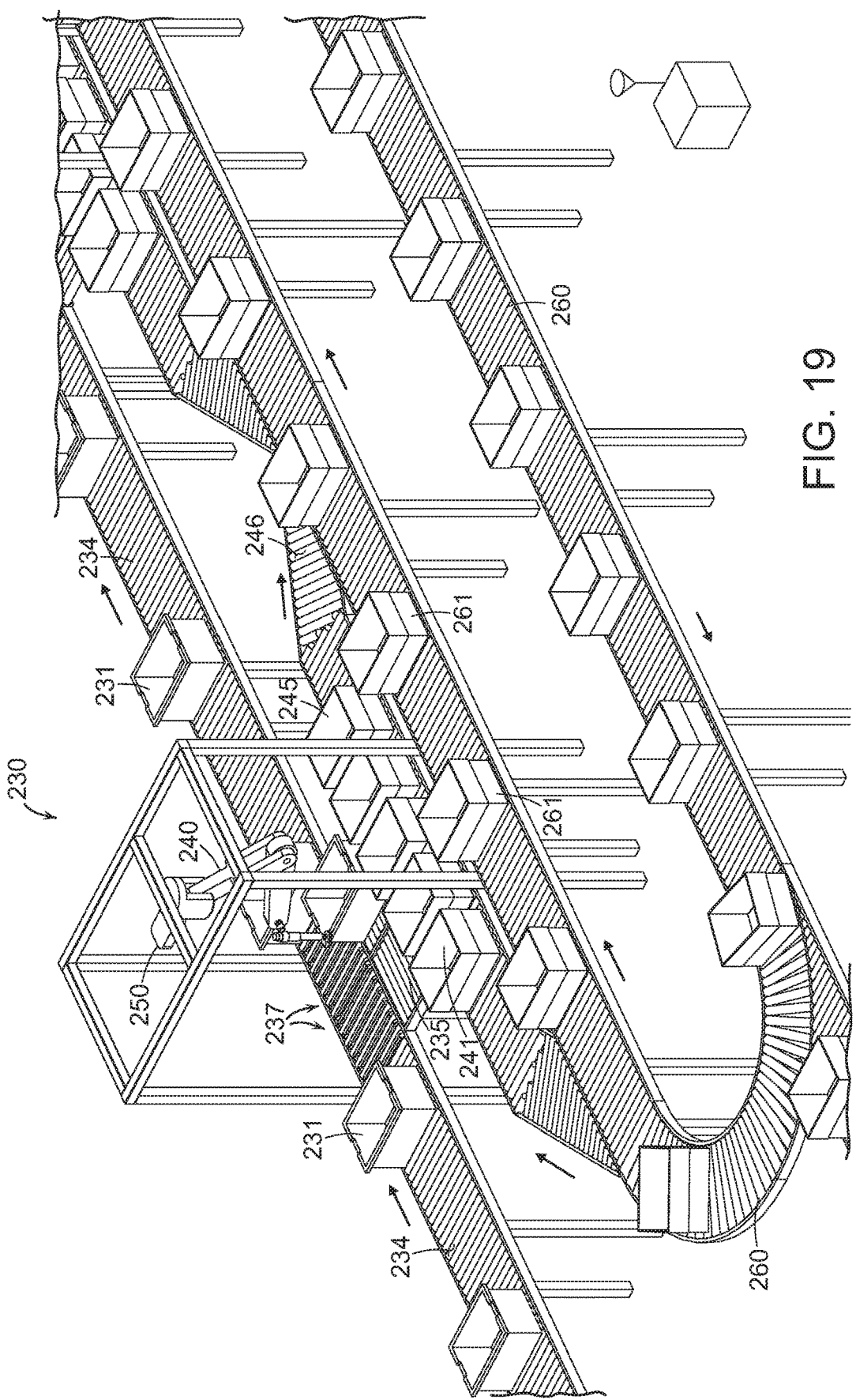
FIG. 19 shows an illustrative diagrammatic view of an object processing system in accordance with another embodiment of the present invention.

FIG. 19 shows a processing station 230 in accordance with a further embodiment of the present invention. The processing station 230 includes a programmable motion device 240 (suspended from a frame 238) and a perception unit 250 for viewing into one or more source containers 232. The source containers 232 are provided at an input area 235 that is in communication with an in-feed conveyor 234 on which further source containers 231 are provided. Source containers 232 may be provided to the input area 235 for example using a bi-directional conveyor which provides that containers may be moved to and from the input area 235. A small number of processing containers 241, 242, 243, 244, 245 are provided on a processing section conveyor 246 that is in communication with a processing system conveyor 260 on which further source containers 261 are provided. A diverter such as diverter 37 discussed above may be used to direct processing containers toward the processing section conveyor 246 from the processing system conveyor 260.

Figure 20:
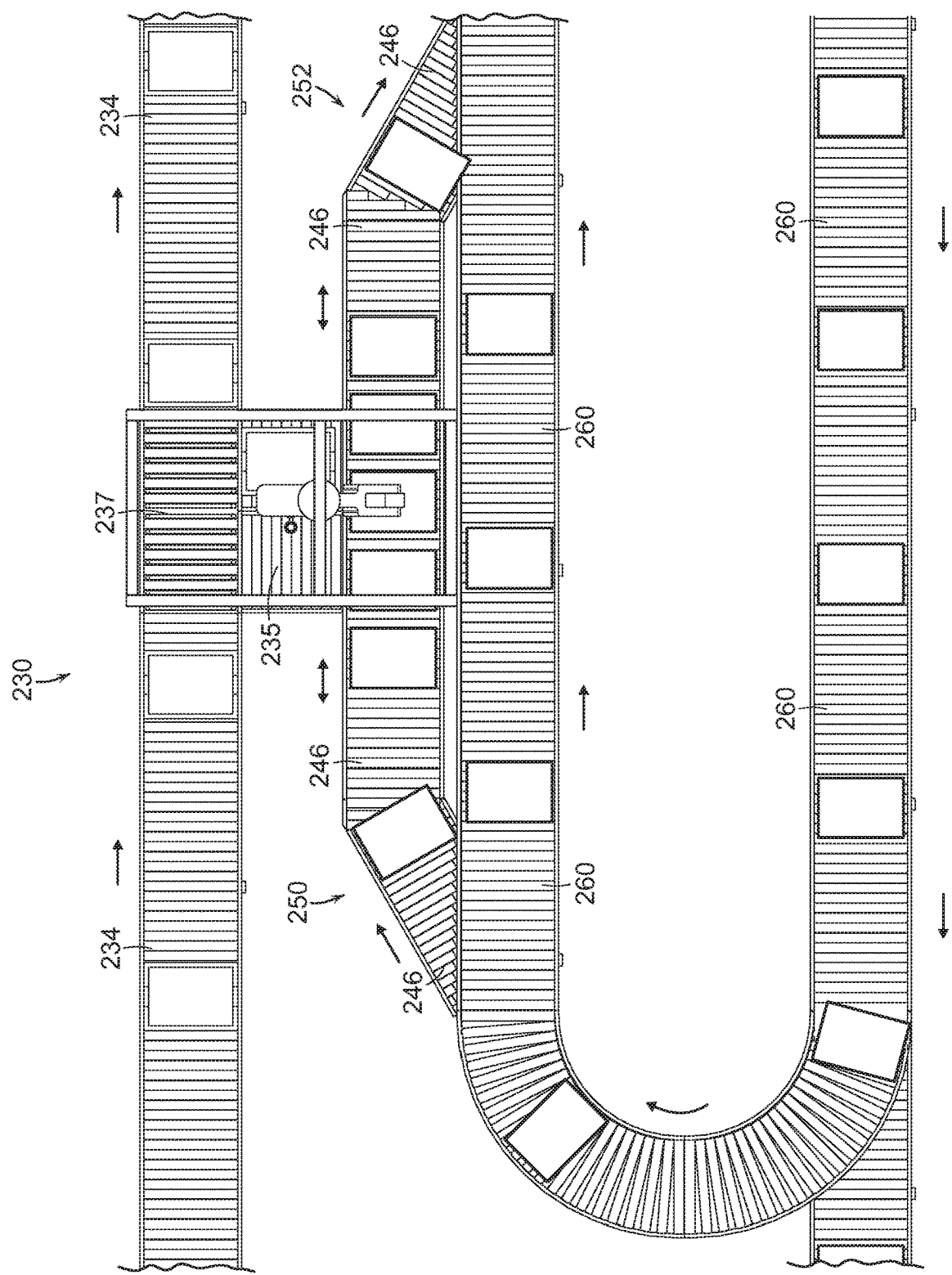
FIG. 20 shows an illustrative diagrammatic top view of the object processing system of FIG. 19.

With further reference to FIG. 20, during use, selected processing containers 241, 242, 243, 244, 245 are diverted from the processing system conveyor 260 toward the processing section conveyor 246, again using a diverter such as diverter 37 discussed above.

The rollers on the processing section conveyor may be individually actuatable and bi-directionally actuatable, providing that that the small number of processing containers (e.g., 241, 242, 243, 244, 245) may be moved independently and bi-directionally on the processing section conveyor 246.

The processing station 230 therefore provides that a small number of processing containers (e.g., 241-245) may be provided adjacent or may be readily moved to be adjacent, the programmable motion device 240. With one or more source containers 232 also being provided adjacent the programmable motion device, objects may readily be processed by moving objects from the source containers 232 to one or more of the processing containers 241-245 in accordance with a manifest. Similar to the system of FIGS. 2-4, objects may therefore be processed by providing a wide variety of objects to a small number of processing containers at each of a plurality of processing stations.

Figure 21:
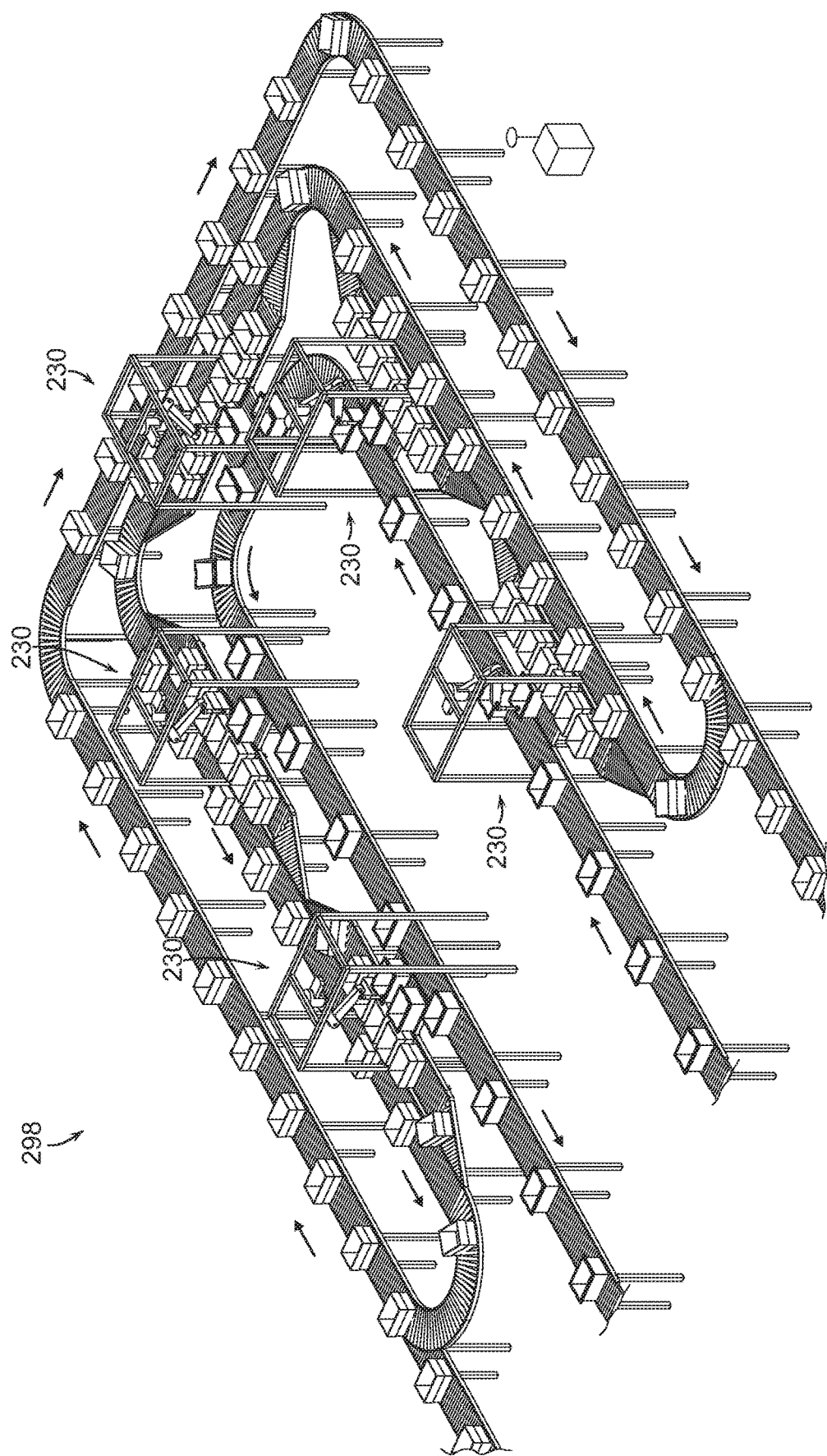
FIG. 21 shows an illustrative diagrammatic view of a processing system in accordance with an embodiment of the invention that includes a plurality of object processing systems of FIG. 19.

FIG. 21 for example, shows a system 290 that includes a plurality of container processing stations 230 as discussed above, wherein each container processing station 230 is in communication with a common in-feed conveyor 234 and a common processing system conveyor 260. In the system of FIG. 21, a wide variety of objects may be processed by providing the objects to a small number of processing containers at each of a plurality of processing stations.

The assignment of carriers may also be dynamic since any carrier may dynamically be assigned to service any package below the track. For example, systems in accordance with further embodiments, provide improved transport and conveyor systems, and provide programmable diverters, in particular, that allow dynamically changing patterns of object handling, with resulting efficiencies in the sortation or processing of objects, and lower space requirements, lower demand for manual operations, and as a consequence, lower capital and operating costs for the entire system.

During use, for example and in accordance with certain embodiments, the system may identify an object by the perception system, and then dynamically assign a destination location (e.g., container) to the object. The process is still governed by the overall manifest, but the assignment of destination bins may be dynamic, based on a variety of heuristic, such as the likelihood of receiving objects for the same designation (e.g., if the likelihood is high, the destination location may be assigned to be close to the home position of the carriage in order to save time), as well as whether to assign a second destination bin to an object (e.g., if the likelihood of receiving objects for the same destination is very high).

The system therefore assigns a bin to an object if a new bin is available, and the object is not yet assigned a bin at the sorting station. What is significant, is that the sorting station is not pre-assigned a large set of collection bins assigned to all possible objects that may appear in the input path. If a bin is not assigned to an object, yet no new bin is available for a new assignment, the object may be returned to the input hopper until it is processed at a time that a new bin becomes available. Further, the central controller may employ wide variety of heuristics that may further shape the process of dynamically assigning objects to collection bins as discussed in yet further detail below. Once bins are either filled or otherwise completed, the completed bins are signaled as being done and ready for further processing.

Figure 22:
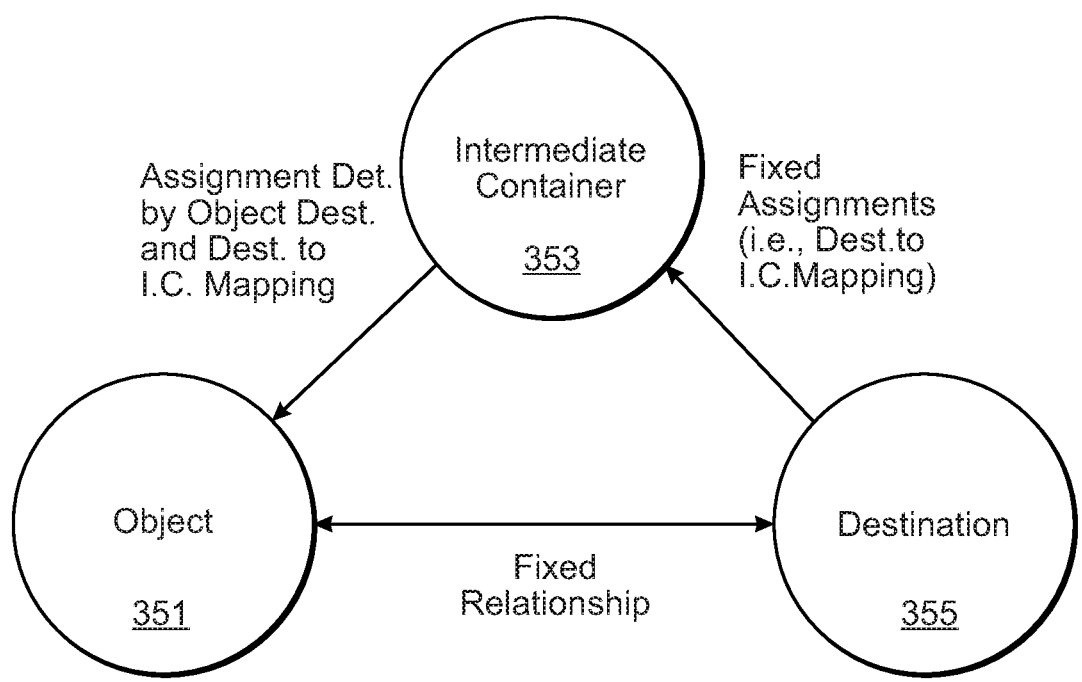
FIG. 22 shows an illustrative diagrammatic view of an object assignment relationships in a conventional sortation system.
Figure 24:
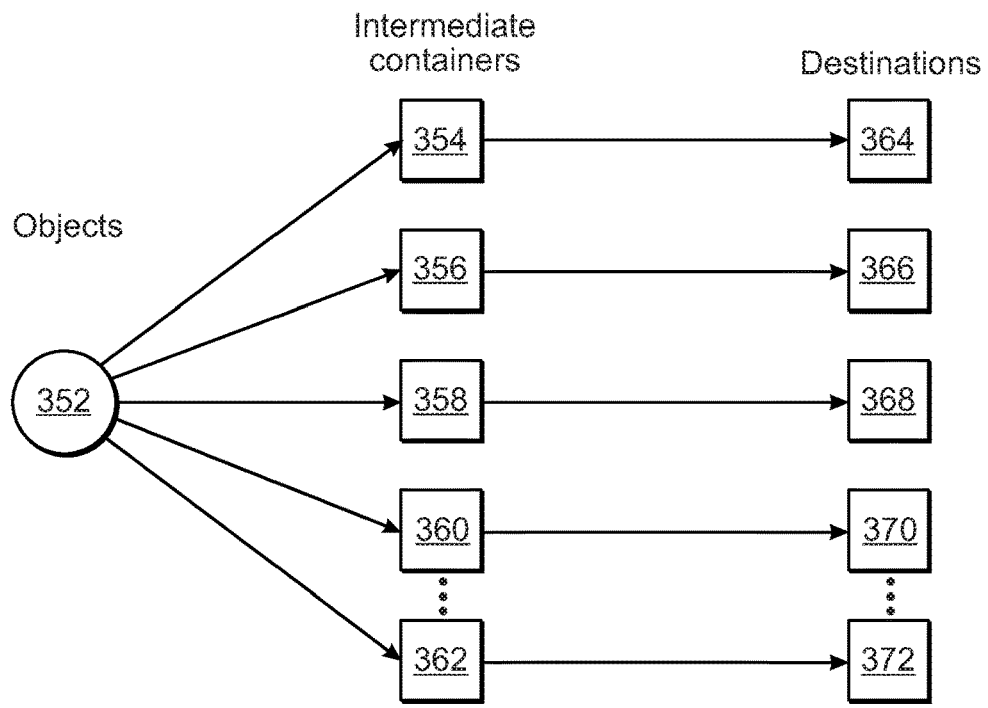
FIG. 24 shows an illustrative diagrammatic view of an object assignment system of FIG. 23.

With reference to FIG. 22, in many processing systems, a fixed relationship may exist between an object 351 and a destination 355 is a fixed relationship. In conventional sortation systems, an intermediate container 353 is assigned a fixed relationship with the destination, and this relationship dictates the assignment of the object 351 to the intermediate container 353. This is shown in FIG. 24, where each destination 364, 366, 368, 170, 172 is associated with an intermediate container 354, 356, 358, 360, 362. As objects 352 are processed, they are simply routed to the appropriate intermediate containers as directed by the fixed relationship.

Figure 23:
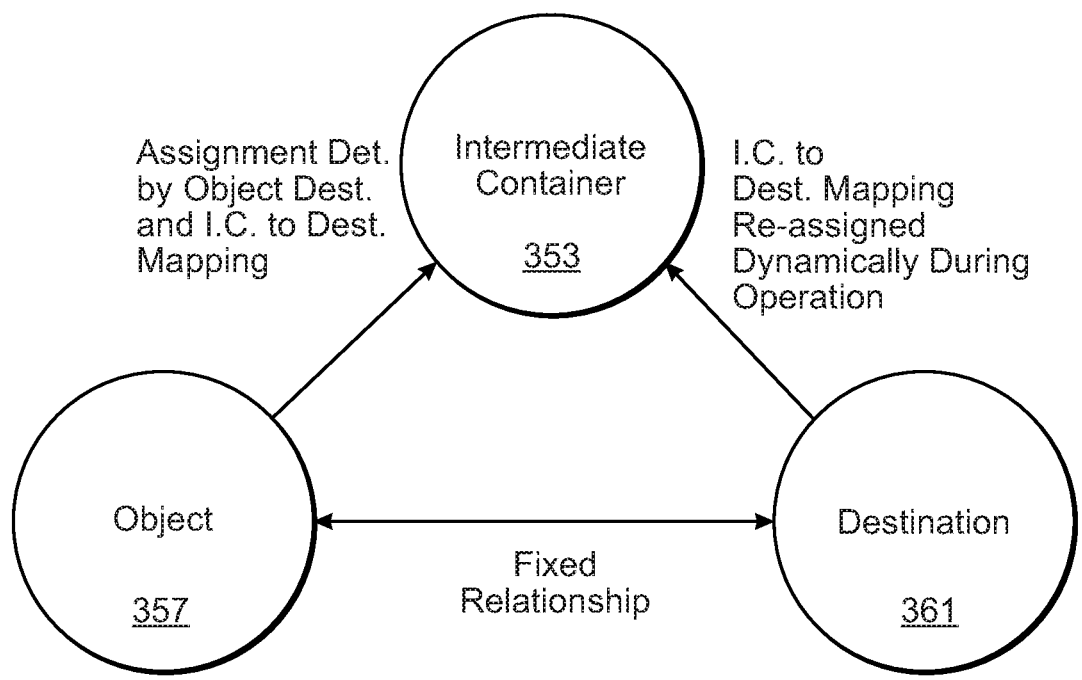
FIG. 23 shows an illustrative diagrammatic view of an object assignment relationships in accordance with certain embodiments of the present invention.

In accordance with embodiments of the present invention on the other hand, the relationships between intermediate containers and destinations is not fixed, and changes dynamically during sortation. FIG. 23, for example, shows that while the relationship between an object 357 and its destination 361 is fixed, the assignment of an intermediate container 359 (e.g., a collection bin), is dynamically chosen based on a variety of heuristics. Once assigned, it remains in place until the collection bin is emptied. As shown in FIG. 23, the assignment of a collection bin (intermediate container 353) for an object 357 is determined by the object destination and the intermediate container to destination mapping, and the destination mapping (between the intermediate container 353 and the destination 361) is re-assigned dynamically during operation.

Figure 25A:
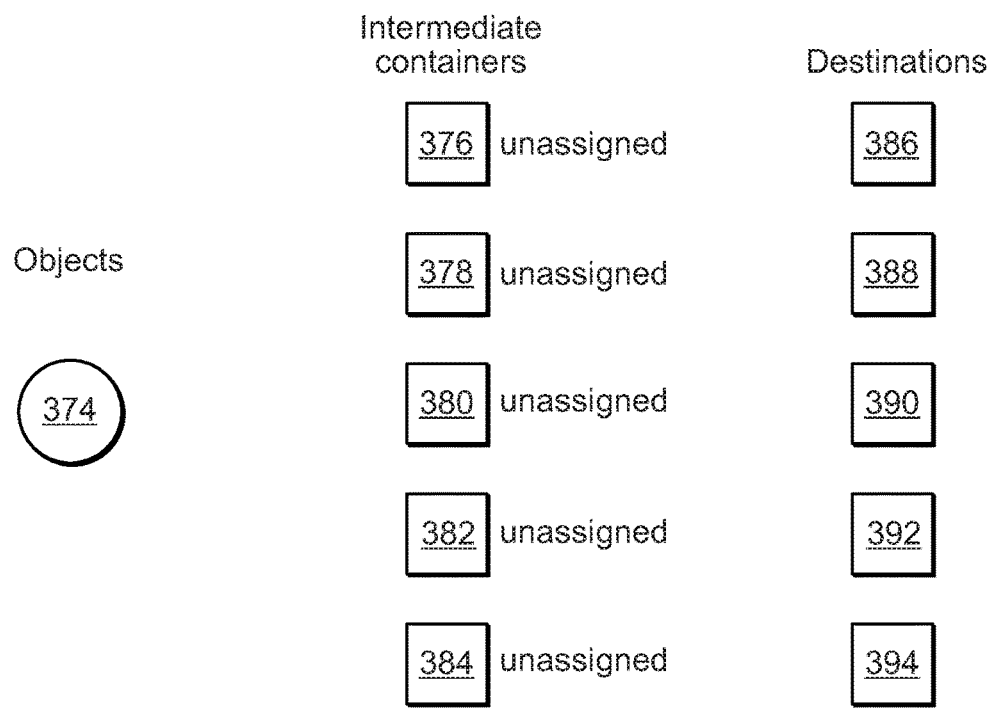
FIGS. 25A-25I show illustrative diagrammatic views of object assignment steps in a system in accordance with certain embodiments of the present invention.
Figure 25B:
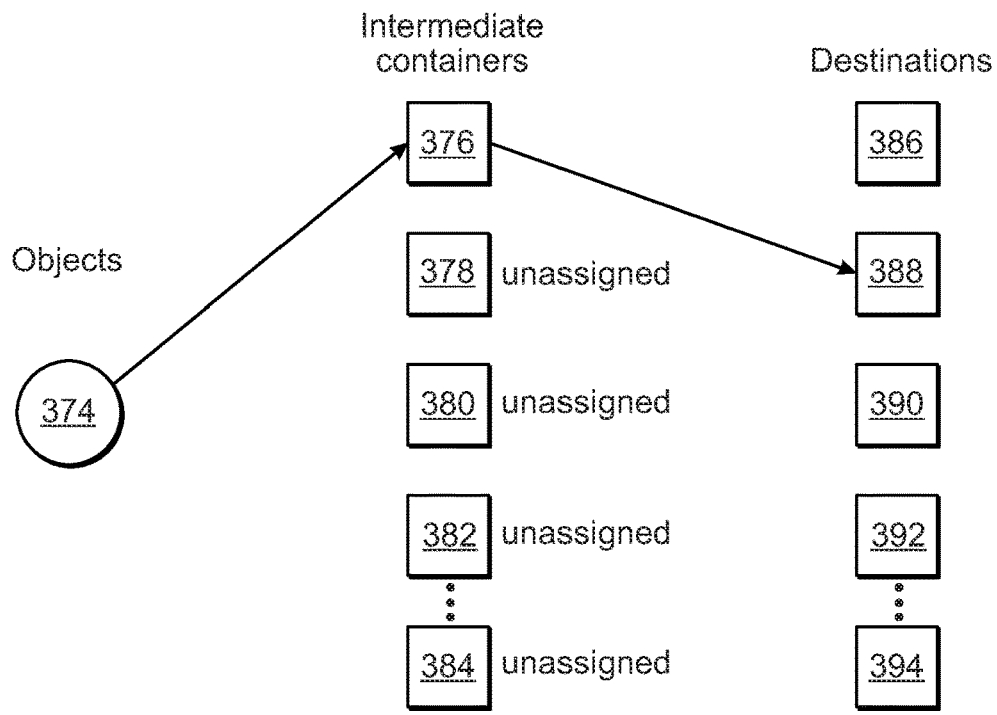
Figure 25C:
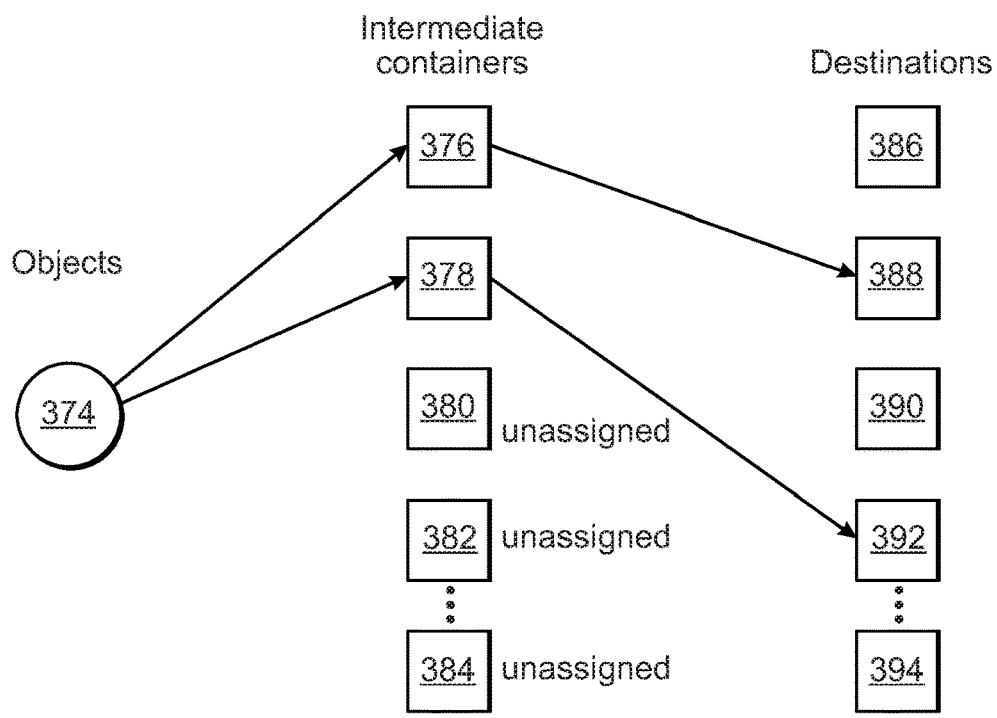
Figure 25D:
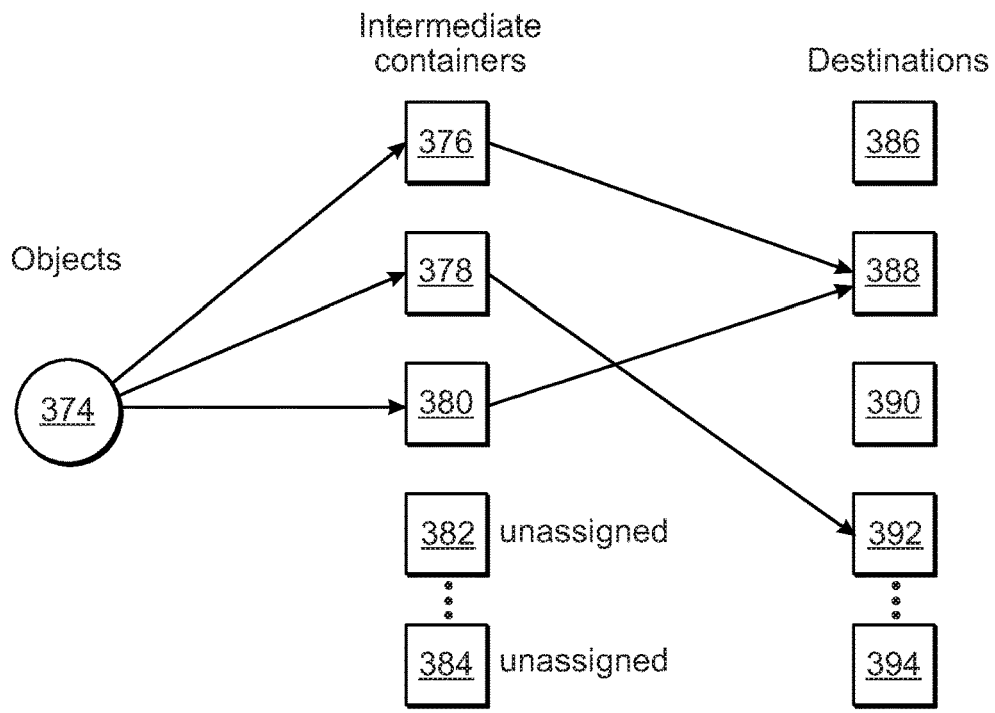
Figure 25E:
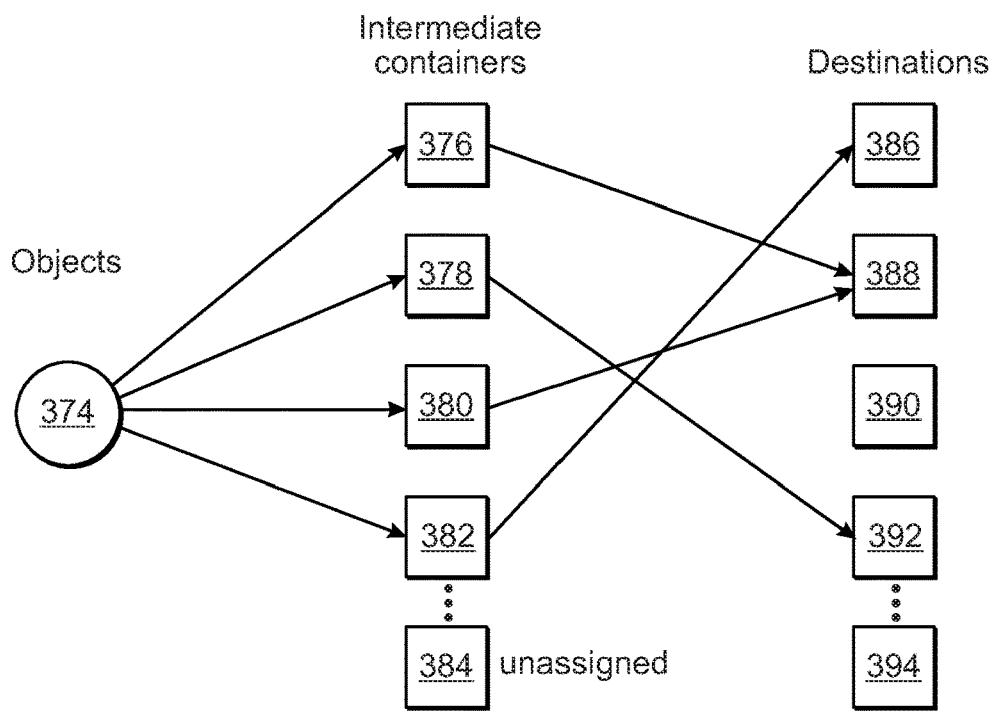
Figure 25F:
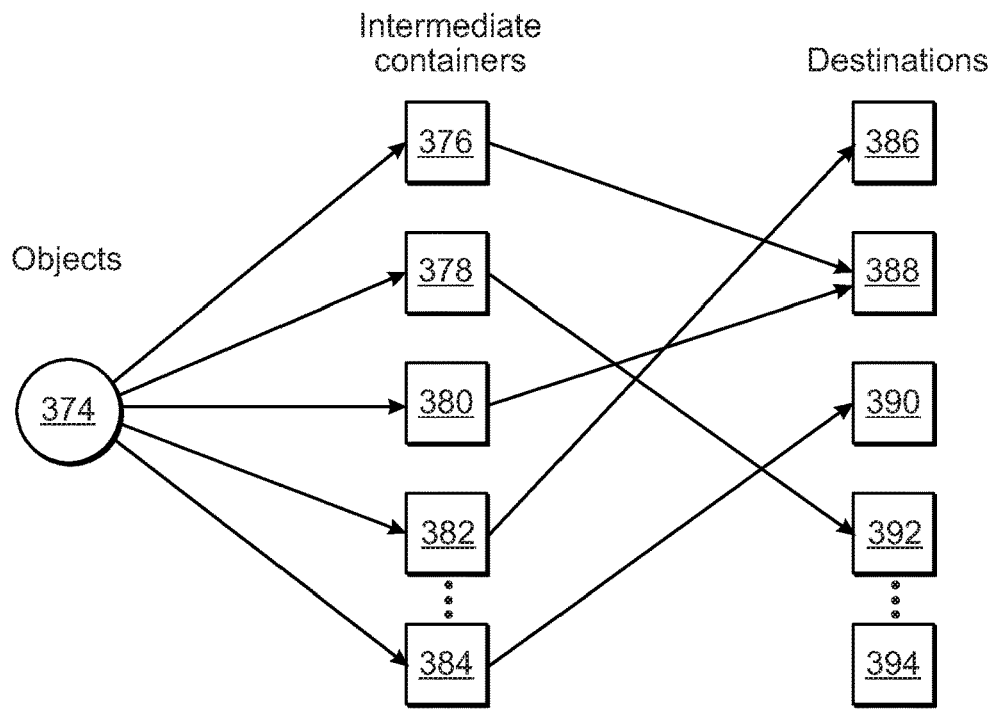

With reference to FIG. 25A, at the beginning of a sortation process, there may be no assigned relationships between intermediate containers 376, 378, 380, 382, 384 and objects 374, or between intermediate containers 376, 378, 380, 382, 384 and destinations 386, 388, 390, 392, 394. As shown in FIG. 25B, when an object's indicia is detected, an intermediate container 376 is assigned to the object, and the object's destination 388 is assigned to the intermediate container as well. Additional objects that are processed and are also associated with the destination 388 are also provided in intermediate container 376. With reference to FIG. 25C, when a different object's indicia is detected that is associated with a different destination 392, a new intermediate container 378 is assigned to the object, and the object's destination 392 is assigned to the intermediate container as well. As noted above, when an object is selected that is associated with a destination, e.g., 388, that already has an intermediate container 376 associated with it, the object may be placed in the same intermediate container 376 (see FIG. 25D). In accordance with certain embodiments of the invention however, and with reference to FIG. 25E, the system may elect to assign a new intermediate container 380 to the destination 388, for example, if it is known that many of the objects are likely to be associated with the destination 388. With reference to FIG. 25F, when another object's indicia is detected that is associated with another destination 386, an new intermediate container 384 is assigned to the object, and the object's destination 386 is assigned to the intermediate container 384.

Figure 25G:
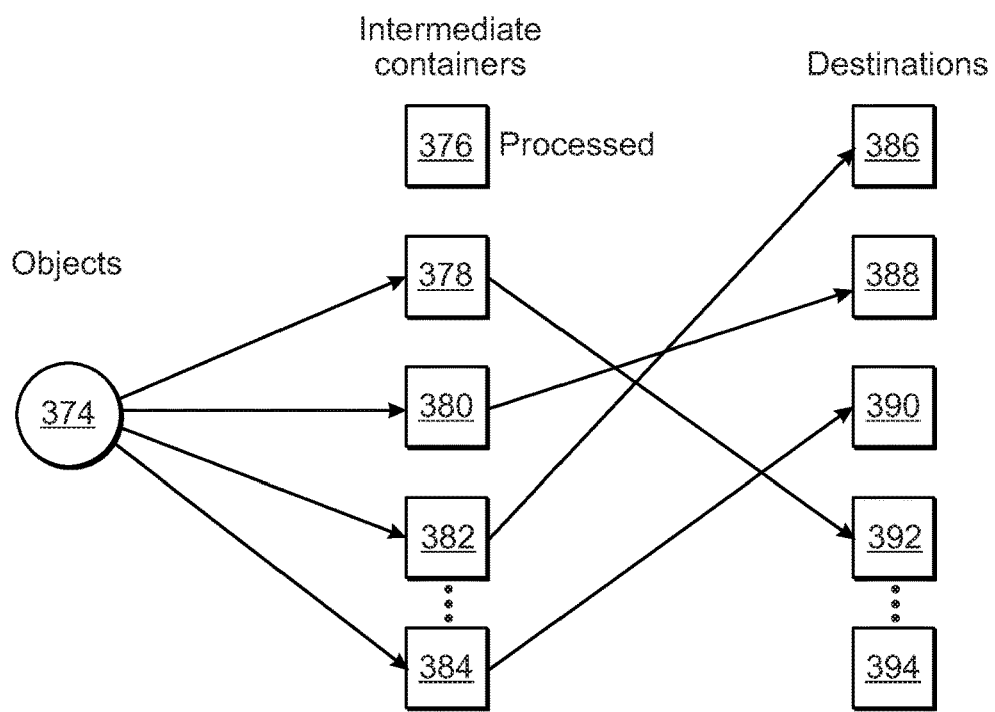
Figure 25H:
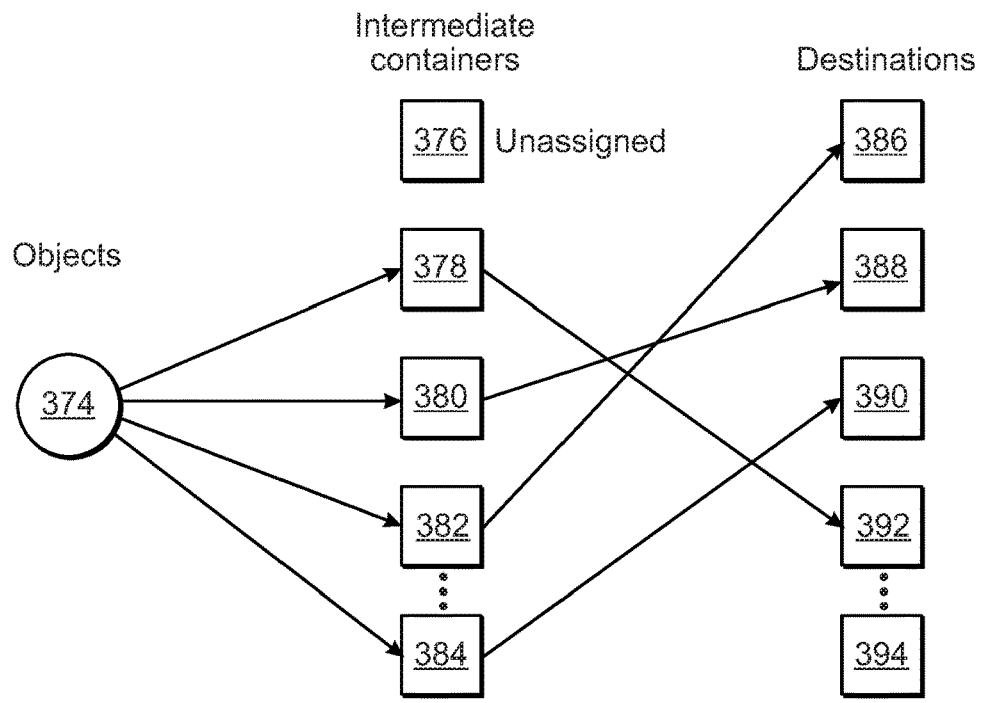
Figure 25I:
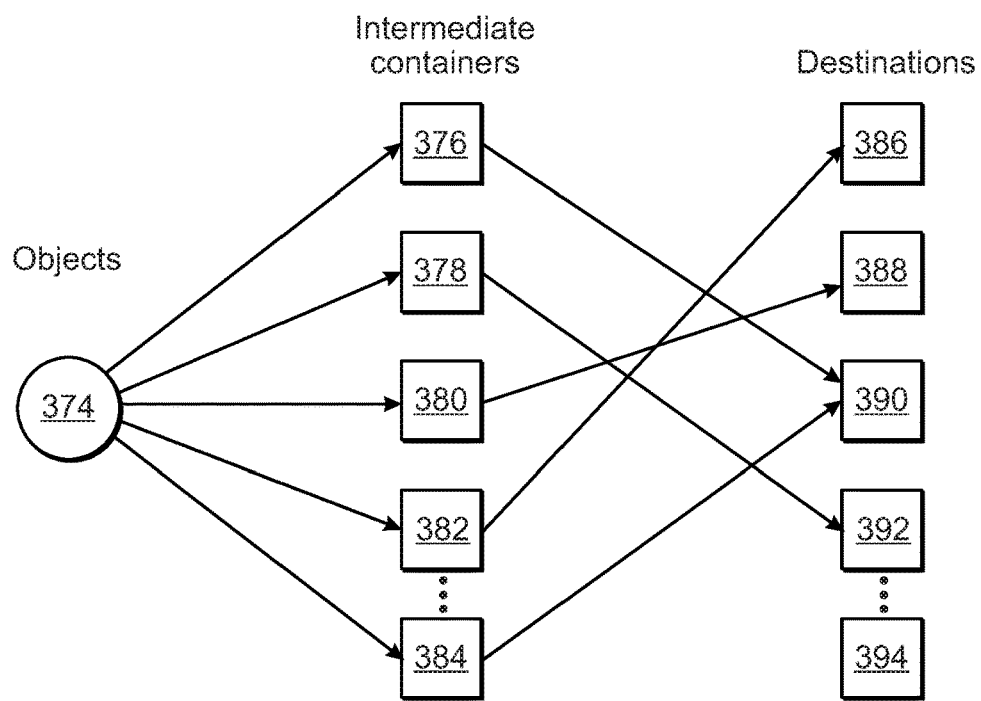

When an intermediate container becomes full or is determined to be otherwise ready for further processing (e.g., if the system determines that it is unlikely to see another object associated with the destination), the intermediate container is emptied and the contents are forward for further processing. For example, and with reference to FIG. 25G, when the system determines that intermediate container 376 is full, the contents are emptied, and the intermediate container 376 is then again unassigned to a destination as shown in FIG. 25H. The intermediate container 376 may then later be reused and associated with a new destination 190 as shown in FIG. 25I.

Figure 26:
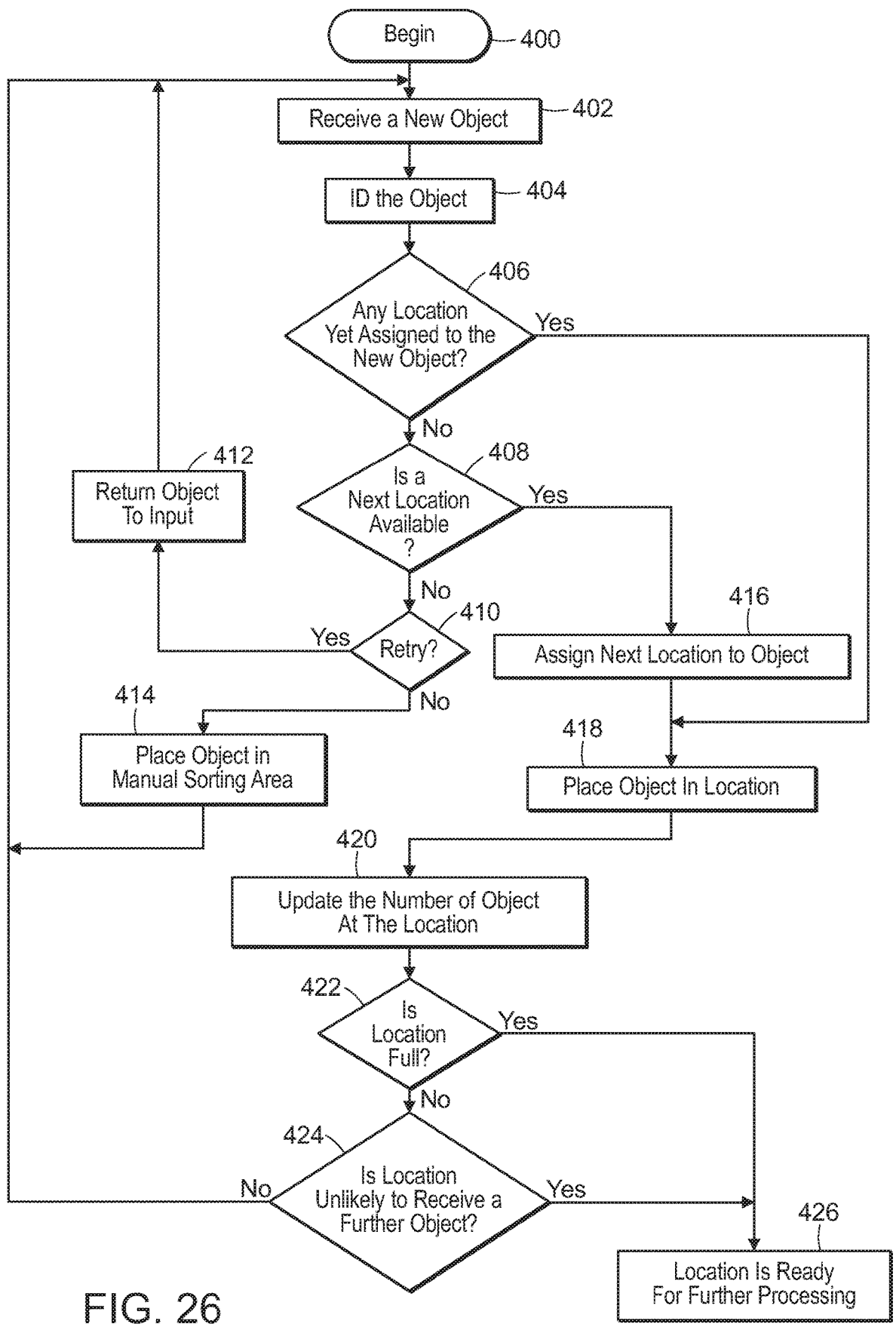
FIG. 26 shows an illustrative flowchart of a process in accordance with an embodiment of the present invention.

As shown in FIG. 26, a sortation process of the invention at a sorting station may begin (step 400) and the articulated arm, or another programmable motion device, receives a new object (step 402). The system identifies the new object (step 404) by an overhead scanner or other scanner system. The system then determines whether any location at the station has yet been assigned to the new object (step 406). If so, the system the places the object at that location (step 418). If not, the system then determines whether a next location is available (Step 408). If not, the system may (either with or without input from a human) determine whether to retry identifying the object (step 410). If so, then the system would return the object to the input stream (step 412) to be again received at a later time (step 402). If not, the system would place the object in a manual sorting area for sortation by a human (step 414). If a next location is available (step 408), the system the assigns a next location to the object (step 416), and the object is then placed in that location (step 418). If a location had already been assigned to the object (step 406), the system the object is placed in that location (step 418). The number of objects at the location is then updated (step 420), and if the location is then full (step 422), the system identifies that the location is ready for further processing (step 226). If not, the system then determines whether (based on prior knowledge and/or heuristics), whether the location is likely to receive a further object (step 424). If so, the system identifies that the location is ready for further processing (step 426). If not, the system returns to receiving a new object (step 402). The further processing may, for example include collecting the items at the location in a single bag for transport to a shipping location.

In accordance with a specific embodiment, the invention provides a user interface that conveys all relevant information to operators, management, and maintenance personnel. In a specific embodiment, this may include lights indicating bins that are about to be ejected (as full), bins that are not completely properly positioned, the in-feed hopper content level, and the overall operating mode of the entire system. Additional information might include the rate of object processing and additional statistics. In a specific embodiment, the system may automatically print labels and scan labels before the operator places the packages on an output conveyor. In accordance with a further embodiment, the system may incorporate software systems that interface with the customer's databases and other information systems, to provide operational information to the customer's system, and to query the customer's system for object information.

Figure 27:
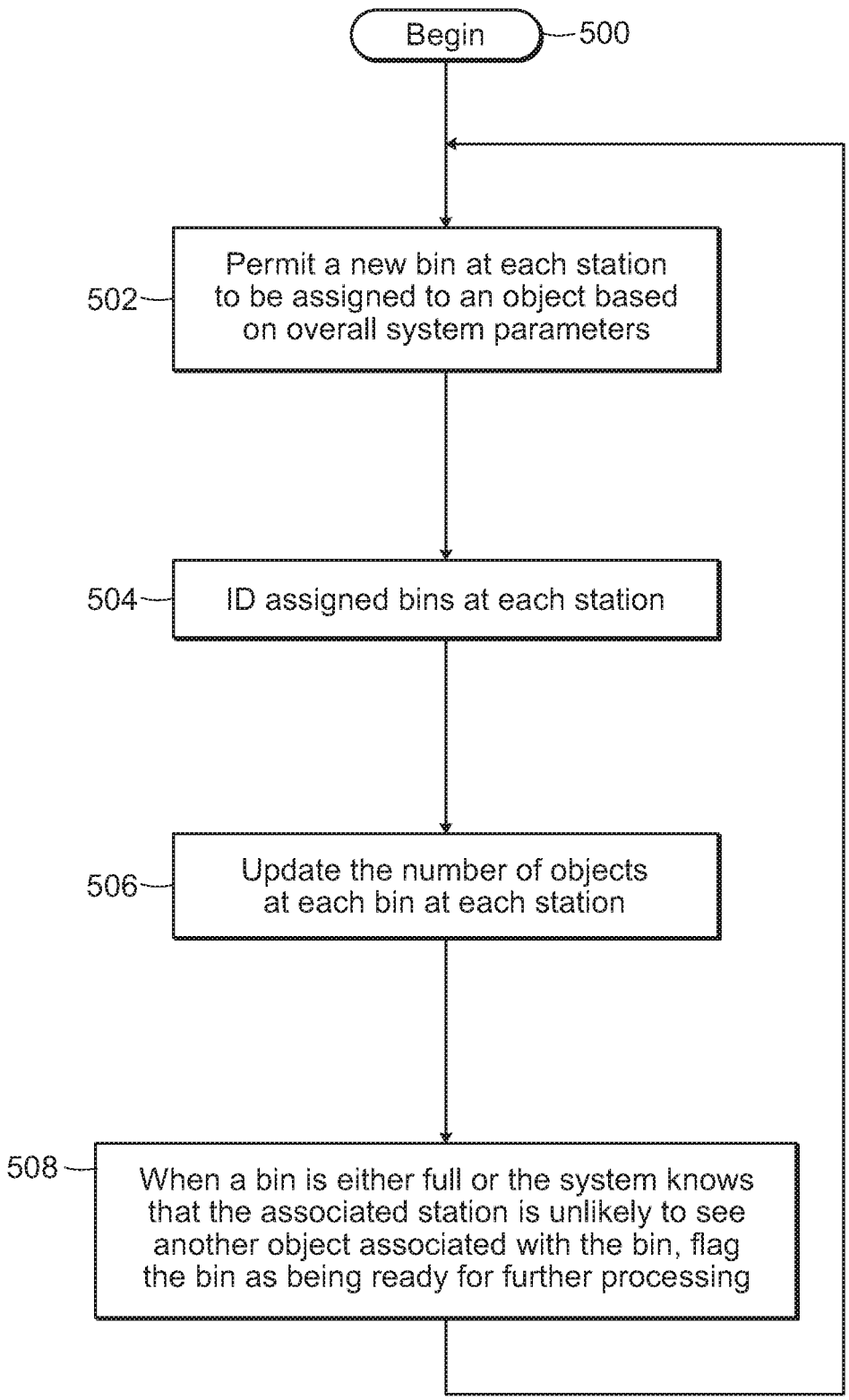
FIG. 27 shows an illustrative flowchart of an overall method of providing dynamic processing of objects.

A process of the overall control system is shown, for example, in FIG. 27. The overall control system may begin (step 500) by permitting a new collection bin at each station to be assigned to a group of objects based on overall system parameters (step 502) as discussed in more detail below. The system then identifies assigned bins correlated with objects at each station (step 504), and updates the number of objects at each bin at each station (step 506). The system then determines that when a bin is either full or the system expects that the associated sorting station is unlikely to see another object associated with the bin, the associated sorting station robotic system will then place the completed bin onto an output conveyor, or signal a human worker to come and empty the bin (step 508), and then return to step 502.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

Control of each of the systems 30, 98, 130, 198, 230 and 298 may be provided by any of the computer systems 70, 170, 270 that are in communication with the storage conveyors and displacement mechanism(s), the processing conveyors and displacement mechanism(s), and the programmable motion device(s). The computer systems 70, 170, 270 also contain the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

Those skilled in the art will appreciate that numerous modifications and variations may be made to the above disclosed embodiments without departing from the spirit and scope of the present invention.

The invention claimed is:

1. A method of processing objects using a programmable motion device, comprising:
   transporting a source container on an input conveyance system having an input area at a processing station, the processing station including an inner processing conveyor and an outer processing conveyor disposed adjacent and in parallel on at least one side of a programmable motion device that includes an end effector;
   transporting a plurality of processing containers to the inner processing conveyor and the outer processing conveyor of the processing station;
   perceiving at the processing station identifying indicia representative of an identity of a plurality of objects in the source container at the input area of the input conveyance system;
   grasping an object from the source container using the end effector;
   identifying a processing container that is associated with the identifying indicia from among the plurality of processing containers;
   moving the object into the identified processing container on the inner processing conveyor using the programmable motion device
   moving the identified processing container from the inner processing conveyor to the outer processing conveyor of the processing station using the programmable motion device; and
   transporting the identified processing container out of the processing station from the outer processing conveyor onto a processing container conveyance system.

2. The method as claimed in claim 1, wherein the processing station further includes a second inner processing conveyor and a second outer processing conveyor disposed adjacent and in parallel on an opposite side of the programmable motion device in parallel with the inner processing conveyor and the outer processing conveyor.

3. The method as claimed in claim 1, wherein further transporting the identified processing container out of the processing station on the processing container conveyance system to one or more other processing stations.

4. The method as claimed in claim 1, further comprising moving the identified processing container from the outer processing conveyor to the inner processing conveyor using a box kicker system.

5. The method as claimed in claim 2, moving another processing container from the second inner processing conveyor to the second outer processing conveyor using the programmable motion device.

6. The method as claimed in claim 2, further comprising moving another processing container from the second outer processing conveyor to the second inner processing conveyor using a box kicker system.

7. The method as claimed in claim 4, wherein the identified processing container is moved from the outer processing conveyor to the inner processing conveyor before the programmable motion device moves the object into the identified processing container.

8. The method as claimed in claim 7, further comprising:
transporting the identified processing container out of each processing station from the outer processing conveyor to an output conveyance system.

9. The method as claimed in claim 7, further comprising:
transporting the identified processing container from the outer processing conveyor to one or more other processing stations among the plurality of processing stations.

10. A method of processing objects using a plurality of programmable motion devices, comprising:
transporting a plurality of source containers on an input conveyance system having an input area at each of a plurality of processing stations, each processing station including an inner processing conveyor and an outer processing conveyor disposed adjacent and in parallel on at least one side of a programmable motion device that includes an end effector for grasping an object;
transporting a plurality of processing containers to the inner processing conveyor and the outer processing conveyor of each processing station from at least one processing container conveyance system;
perceiving, at each processing station, identifying indicia representative of an identity of a plurality of objects in a source container at each input area of the input conveyance system;
grasping, at each processing station, an object from the source container using the end effector of the programmable motion device;
identifying, at each processing station, a processing container that is associated with the identifying indicia from among the plurality of processing containers;
moving, at each processing station, the identified processing container from the outer processing conveyor to the inner processing conveyor before the programmable motion device moves the object into the identified processing container;
moving, at each processing station, the object into the identified processing container on the inner processing conveyor using the programmable motion device; and
moving, at each processing station, the identified processing container from the inner processing conveyor to the output processing conveyor using the programmable motion device.

11. The method as claimed in claim 10, wherein perceiving the identity of the plurality of objects includes perceiving indicia on one of the plurality of objects.

12. The method as claimed in claim 10, wherein perceiving the identity of the plurality of objects includes perceiving indicia on the source container containing the plurality of objects.

13. The method as claimed in claim 10, wherein identifying the plurality of objects occurs while the source container is being transported on the input conveyance system.

14. The method as claimed in claim 10, wherein the input area includes a processing station input in communication with the input conveyance system, and wherein identifying the plurality of objects occurs when the source container is received at the processing station input.

15. The method as claimed in claim 10, wherein each of the plurality of source containers includes a plurality of different objects.

16. The method as claimed in claim 10, further comprising determining a grasp location of the object to be acquired from the plurality of objects at the input area.

17. The method as claimed in claim 10, wherein the at least a portion of the input conveyance system is positioned below a portion of the at least one processing container conveyance system at one or more of the plurality of processing stations.

18. The method as claimed in claim 10, further comprising dynamically assigning an identity assignment to each processing container according to a manifest.

19. The method as claimed in claim 10, wherein the input conveyance system is provided as a loop, with the processing stations located outside of the loop.

20. The method as claimed in claim 19, wherein the at least one processing container conveyance system includes at least two output conveyors positioned outside of the processing stations.

21. The method as claimed in claim 10, wherein the at least one processing container conveyance system is provided as a loop, with the processing stations located outside of the loop.

22. The method as claimed in claim 21, wherein the input conveyance system includes at least two input conveyors positioned outside of the processing stations.

23. A method of processing objects using a plurality of programmable motion devices, further comprising:
transporting a plurality of source containers on an input conveyance system having an input area at each of a plurality of processing stations, each processing station including a plurality of processing conveyors and a programmable motion device that includes an end effector for grasping an object, wherein the plurality of processing conveyors includes an inner processing conveyor and an outer processing conveyor disposed adjacent and in parallel on both sides of the programmable motion device; and
transporting processing containers between each processing station and a processing container conveyance system using the outer processing conveyors, at least one of the input conveyance system and the being provided as a loop;
wherein the method further comprises at each processing station:
perceiving identifying indicia representative of an identity of a plurality of objects in a source container received at the input area of the input conveyance system;
moving one or more identified processing containers associated with the identifying indicia transversely from at least one of the outer processing conveyors to at least one of the inner processing conveyors;
moving one or more objects into the one or more identified processing containers on the at least one inner processing conveyor using the programmable motion device;
moving the one or more identified processing containers from the at least one inner processing conveyor to an adjacent outer processing conveyor using the programmable motion device; and
transporting the one or more identified processing containers on the adjacent outer processing conveyor out of the processing station onto the processing container conveyance system to one or more other processing stations among the plurality of processing stations.

24. The method as claimed in claim 23, wherein perceiving the identity of the plurality of objects includes perceiving indicia on one of the plurality of objects.

25. The method as claimed in claim 23, wherein perceiving the identity of the plurality of objects includes perceiving indicia on the source container containing the plurality of objects.

26. The method as claimed in claim 23, wherein identifying the plurality of objects occurs while the source container is being transported on the input conveyance system.

27. The method as claimed in claim 23, wherein the input area includes a processing station input in communication with the input conveyance system, and wherein identifying the plurality of objects occurs when the source container is received at the processing station input.

28. The method as claimed in claim 23, wherein each of the plurality of source containers includes a plurality of different objects.

29. The method as claimed in claim 23, further comprising determining a grasp location of the object to be acquired from the plurality of objects at the input area.

30. The method as claimed in claim 23, wherein at least a portion of the input conveyance system is positioned below a portion of the processing container conveyance system at one or more of the plurality of processing stations.

31. The method as claimed in claim 23, wherein the input conveyance system is provided as a loop, with the processing stations located outside of the loop.

32. The method as claimed in claim 31, wherein the processing container conveyance system includes at least two output conveyors positioned outside of the processing stations.

33. The method as claimed in claim 23, wherein the output conveyance system is provided as a loop, with the processing stations located outside of the loop.

34. The method as claimed in claim 33, wherein the input conveyance system includes at least two input conveyors positioned outside of the processing stations.

35. The method as claimed in claim 33, further comprising dynamically assigning an identity assignment to each processing container according to a manifest.

36. A processing system for processing objects using a programmable motion device, said processing system comprising:
   a plurality of processing stations, each processing station including a programmable motion device that includes an end effector for grasping an object;
   an input conveyance system having an input area at each of the plurality of processing stations, wherein the input conveyance system selective transports a plurality of source containers to the input area at one or more of the plurality of processing stations;
   each processing station further including a perception unit for perceiving identifying indicia representative of an identity of a plurality of objects in a source container received at the input area of the input conveyance system;
   each processing station further including an inner processing conveyor and an outer processing conveyor disposed adjacent and in parallel on at least one side of the programmable motion device for providing a plurality of processing containers to the programmable motion device;
   a controller that identifies one or more processing containers that are associated with the identifying indicia from among the plurality of processing containers; and
   an output conveyance system in communication with the outer processing conveyor at each processing station for transporting any of the plurality of processing containers that contain processed objects out of the processing station,
   wherein any of the one or more identified processing containers on the outer processing container are moved transversely from the outer processing container to the inner processing conveyor adjacent to the programmable motion device, and wherein any of the plurality of processing containers on the inner processing container that are not associated with the identifying indicia are moved transversely from the inner processing conveyor to the outer processing conveyor away from the programmable motion device, and
   wherein the end effector of the programmable motion device moves an object from the source container at the input area of the input conveyance system into any of the one or more identified processing containers on the inner processing conveyor.

37. The processing system as claimed in claim 36, wherein at least a portion of the input conveyance system is positioned below a portion of the output conveyance system.

38. The processing system as claimed in claim 36, wherein the identified processing container is provided as a box tray assembly.

39. The processing system as claimed in claim 36, wherein the programmable motion device is actuatable to push any of the plurality of processing containers on the inner processing conveyor transversely to the outer processing conveyor away from the programmable motion device.

40. The processing system as claimed in claim 36, further comprising a box kicker system that includes a rotatable arm that moves along the length of the outer processing conveyor and is actuatable to push any of the plurality of processing containers on the outer processing conveyor transversely to the inner processing conveyor adjacent to the programmable motion device.

41. The processing system as claimed in claim 36, wherein the input conveyance system is provided as a loop, with the processing stations located outside of the loop.

42. The processing system as claimed in claim 41, wherein the output conveyance system includes at least two output conveyors positioned outside of the processing stations.

43. The processing system as claimed in claim 36, wherein the output conveyance system is provided as a loop, with the processing stations located outside of the loop.

44. The processing system as claimed in claim 43, wherein the input conveyance system includes at least two input conveyors positioned outside of the processing stations.

45. The processing system as claimed in claim 36, wherein the input area includes a processing station input in communication with the input conveyance system, and wherein the perception unit is positioned over the processing station input.

46. The processing system as claimed in claim 45, wherein each of the plurality of source containers includes a plurality of different objects.

* * * * *

UNITED STATES PATENT AND TRADEMARK OFFICE
CERTIFICATE OF CORRECTION

PATENT NO. : 10,843,333 B2  
APPLICATION NO. : 16/001630  
DATED : November 24, 2020  
INVENTOR(S) : Thomas Wagner et al.

Page 1 of 1

It is certified that error appears in the above-identified patent and that said Letters Patent is hereby corrected as shown below:

In the Specification

Column 7, Line 37 should read:
"location as shown in FIG. 6. Grasp locations may be"

Column 10, Line 6 should read:
"contacting the processing container 55 as shown in FIG. 11B."

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*